(12) United States Patent
Mcconnell et al.

(10) Patent No.: US 8,000,938 B2
(45) Date of Patent: Aug. 16, 2011

(54) METHOD AND SYSTEM FOR TRACKING AND MANAGING DESTRUCTION, RECONSTITUTION, OR RECLAMATION OF REGULATED SUBSTANCES

(75) Inventors: Robert S. Mcconnell, Shakopee, MN (US); Paul Hepperla, Carver, MN (US); Daniel T. Johnson, Medina, MN (US)

(73) Assignee: Verisae, Inc., Minneapolis, MN (US)

( * ) Notice: Subject to any disclaimer, the term of this patent is extended or adjusted under 35 U.S.C. 154(b) by 400 days.

(21) Appl. No.: 12/252,265

(22) Filed: Oct. 15, 2008

(65) Prior Publication Data

US 2009/0132176 A1    May 21, 2009

Related U.S. Application Data

(63) Continuation-in-part of application No. 12/042,917, filed on Mar. 5, 2008, which is a continuation-in-part of application No. 11/744,713, filed on May 4, 2007, now Pat. No. 7,440,871, application No. 12/252,265, which is a continuation-in-part of application No. 11/423,860, filed on Jun. 13, 2006, now Pat. No. 7,369,968, which is a continuation-in-part of application No. 10/768,957, filed on Jan. 30, 2004, now Pat. No. 7,062,389, application No. 12/252,265, which is a continuation-in-part of application No. 10/429,619, filed on May 5, 2003, now Pat. No. 7,512,523.

(60) Provisional application No. 60/893,261, filed on Mar. 3, 2007, provisional application No. 60/444,091, filed on Jan. 31, 2003, provisional application No. 60/432,120, filed on Dec. 9, 2002.

(51) Int. Cl.
*G06F 19/00*    (2006.01)

(52) U.S. Cl. .......................................... 702/188; 705/34
(58) Field of Classification Search .................... 702/23, 702/182–185, 188; 705/34
See application file for complete search history.

(56) References Cited

U.S. PATENT DOCUMENTS

| 4,612,620 A | 9/1986 | Davis et al. |
| 4,688,026 A | 8/1987 | Scribner et al. |
| 4,755,957 A | 7/1988 | White et al. |
| 4,989,141 A | 1/1991 | Lyons et al. |
| 5,079,930 A | 1/1992 | Beaverson et al. |
| 5,198,774 A | 3/1993 | Williams, II et al. |
| 5,231,841 A | 8/1993 | McClelland et al. |
| 5,434,775 A | 7/1995 | Sims et al. |
| 5,537,313 A | 7/1996 | Pirelli |
| 5,572,438 A | 11/1996 | Ehlers et al. |

(Continued)

FOREIGN PATENT DOCUMENTS

EP    1566875    8/2005

(Continued)

OTHER PUBLICATIONS

Office Action received in related case U.S. Appl. No. 12/050,738, mailed Dec. 30, 2008, 22 pp.

(Continued)

*Primary Examiner* — Edward Raymond
(74) *Attorney, Agent, or Firm* — Faegre & Benson LLP

(57) ABSTRACT

Various embodiments of methods and systems described herein relate to tracking and/or managing the destruction, reconstitution, or reclamation of regulated substances, including, in certain embodiments, tracking the associated GHG emissions and carbon valuation.

19 Claims, 8 Drawing Sheets

U.S. PATENT DOCUMENTS

| | | | |
|---|---|---|---|
| 5,629,687 A | 5/1997 | Sutton et al. | |
| 5,732,401 A | 3/1998 | Conway | |
| 5,748,956 A | 5/1998 | Lafer et al. | |
| 5,752,244 A | 5/1998 | Rose et al. | |
| 5,758,126 A | 5/1998 | Daniels | |
| 5,821,937 A | 10/1998 | Tonelli et al. | |
| 5,831,610 A | 11/1998 | Tonelli et al. | |
| 5,845,265 A | 12/1998 | Woolston | |
| 5,859,778 A | 1/1999 | Kuroda et al. | |
| 5,860,286 A | 1/1999 | Tulpule | |
| 5,910,776 A | 6/1999 | Black | |
| 5,918,207 A | 6/1999 | McGovern et al. | |
| 5,923,850 A | 7/1999 | Barroux | |
| 5,946,662 A | 8/1999 | Ettl et al. | |
| 5,956,658 A | 9/1999 | McMahon | |
| 5,980,090 A | 11/1999 | Royal, Jr. | |
| 5,987,903 A | 11/1999 | Bathla | |
| 5,996,889 A | 12/1999 | Fuchs et al. | |
| 6,088,796 A | 7/2000 | Cianfrocca et al. | |
| 6,115,672 A | 9/2000 | Caveny et al. | |
| 6,128,602 A | 10/2000 | Northington et al. | |
| 6,154,738 A | 11/2000 | Call | |
| 6,169,979 B1 | 1/2001 | Johnson | |
| 6,211,782 B1 | 4/2001 | Sandelman et al. | |
| 6,237,020 B1 | 5/2001 | Leymann et al. | |
| 6,293,114 B1 | 9/2001 | Kamemoto | |
| 6,298,333 B1 | 10/2001 | Manzi et al. | |
| 6,385,510 B1 | 5/2002 | Hoog et al. | |
| 6,430,542 B1 | 8/2002 | Moran | |
| 6,437,692 B1 | 8/2002 | Petite et al. | |
| 6,460,082 B1 | 10/2002 | Lumelsky et al. | |
| 6,650,346 B1 | 11/2003 | Jaeger et al. | |
| 6,892,546 B2 | 5/2005 | Singh et al. | |
| 6,952,680 B1 | 10/2005 | Melby et al. | |
| 7,032,241 B1 | 4/2006 | Venkatachary et al. | |
| 7,062,389 B2 | 6/2006 | Johnson et al. | |
| 7,062,446 B1 | 6/2006 | Suhy, Jr. et al. | |
| 7,124,059 B2 | 10/2006 | Wetzer et al. | |
| 7,142,949 B2 | 11/2006 | Brewster et al. | |
| 7,149,701 B2 | 12/2006 | McKinney | |
| 7,196,621 B2 | 3/2007 | Kochis | |
| 7,259,675 B2 | 8/2007 | Baker et al. | |
| 7,304,573 B2 | 12/2007 | Postma | |
| 7,333,880 B2 | 2/2008 | Brewster et al. | |
| 7,369,968 B2 | 5/2008 | Johnson et al. | |
| 7,440,871 B2 | 10/2008 | McConnell et al. | |
| 7,647,207 B2 | 1/2010 | McDonnell et al. | |
| 2001/0047383 A1 | 11/2001 | Dutta | |
| 2002/0016757 A1 | 2/2002 | Johnson et al. | |
| 2002/0059364 A1 | 5/2002 | Coulthard et al. | |
| 2002/0070971 A1 | 6/2002 | Brown et al. | |
| 2002/0138361 A1 | 9/2002 | Chen | |
| 2002/0143693 A1 | 10/2002 | van Soestbergen et al. | |
| 2003/0069743 A1 | 4/2003 | Nordrum | |
| 2003/0154141 A1 | 8/2003 | Capazario et al. | |
| 2004/0019511 A1 | 1/2004 | McKinney | |
| 2004/0024662 A1 | 2/2004 | Gray et al. | |
| 2004/0078306 A1 | 4/2004 | Whiteley et al. | |
| 2004/0095237 A1 | 5/2004 | Chen et al. | |
| 2004/0111697 A1 | 6/2004 | Johnson et al. | |
| 2004/0162642 A1 | 8/2004 | Gasper et al. | |
| 2004/0193449 A1 | 9/2004 | Wildman et al. | |
| 2004/0225676 A1 | 11/2004 | Johnson et al. | |
| 2004/0249515 A1 | 12/2004 | Johnson et al. | |
| 2005/0021710 A1 | 1/2005 | Johnson et al. | |
| 2005/0086163 A1 | 4/2005 | Johnson et al. | |
| 2005/0109829 A1 | 5/2005 | Postma | |
| 2005/0154669 A1 | 7/2005 | Streetman | |
| 2005/0205658 A1 | 9/2005 | Baker et al. | |
| 2005/0246190 A1 | 11/2005 | Sandor et al. | |
| 2005/0248454 A1 | 11/2005 | Hanson et al. | |
| 2006/0142961 A1 | 6/2006 | Johnson et al. | |
| 2006/0161450 A1 | 7/2006 | Carey et al. | |
| 2006/0170889 A1 | 8/2006 | Honda | |
| 2006/0187026 A1 | 8/2006 | Kochis | |
| 2006/0256308 A1 | 11/2006 | Honda | |
| 2007/0010914 A1 | 1/2007 | Johnson et al. | |
| 2007/0043538 A1 | 2/2007 | Johnson et al. | |
| 2007/0096899 A1 | 5/2007 | Johnson et al. | |
| 2007/0260405 A1 | 11/2007 | McConnell et al. | |
| 2007/0268138 A1 | 11/2007 | Chung et al. | |
| 2008/0177605 A1 | 7/2008 | Zimmerman | |
| 2008/0243687 A1 | 10/2008 | Johnson et al. | |
| 2008/0255899 A1 | 10/2008 | McConnell et al. | |
| 2008/0306860 A1* | 12/2008 | Musier et al. | 705/37 |
| 2009/0018884 A1 | 1/2009 | McConnell et al. | |
| 2009/0072977 A1 | 3/2009 | Johnson et al. | |
| 2009/0119305 A1 | 5/2009 | Johnson et al. | |
| 2009/0126388 A1 | 5/2009 | Johnson et al. | |
| 2009/0171975 A1 | 7/2009 | McConnell et al. | |
| 2010/0070404 A1 | 3/2010 | McConnell et al. | |
| 2010/0070423 A1 | 3/2010 | McDonnell et al. | |
| 2010/0121770 A1 | 5/2010 | Johnson | |
| 2010/0138190 A1 | 6/2010 | McConnell et al. | |

FOREIGN PATENT DOCUMENTS

| | | |
|---|---|---|
| JP | 10340846 | 12/1998 |
| JP | 2004-301825 | 10/2004 |
| WO | WO 9941717 | 2/1998 |
| WO | WO 9966436 | 12/1999 |
| WO | WO 0017984 | 3/2000 |
| WO | WO 0197146 | 12/2001 |
| WO | WO 0207365 | 1/2002 |
| WO | WO 02090914 | 11/2002 |
| WO | WO 2005048328 | 5/2005 |
| WO | WO 2005062351 | 7/2005 |

OTHER PUBLICATIONS

Response to European Office Action dated Apr. 14, 2008, from related European application No. 03796979.7, dated Feb. 11, 2009, 15 pp.

U.S. Appl. No. 60/444,437, filed Feb. 3, 2003.

U.S. Appl. No. 60/433,179, filed Dec. 13, 2003.

Response to Written Opinion mailed Sep. 15, 2005, filed Dec. 15, 2005, in related international application No. PCT/US2004/003008, 7 pp.

Office Action received in related U.S. Appl. No. 10/734,725, dated Feb. 26, 2009, 12 pp.

Preliminary Amendment filed Feb. 2, 2009, in related U.S. Appl. No. 10/734,725, 49 pp.

Pre-Interview Communication received in related U.S. Appl. No. 10/734,725, dated Dec. 22, 2008, 19 pp.

Examination Report dated Jul. 10, 2008, received in related Australian Application No. 20003297910, 7 pp.

European Office Action from European application No. 01 948 454.2-2221, dated Mar. 26, 2008, 13 pp.

European Office Action from European application No. 03796979.7, dated Apr. 14, 2008, 6 pp.

European Office Action from European application No. 04781780.4-2221, dated May 12, 2006, 2 pp.

European Office Action from European application No. 04781780.4-2221, dated Nov. 20, 2006, 2 pp.

Response to European Office Action for related case 04781780.4-2221, dated May 25, 2007, 13 pp.

Extended European Search Report from European application No. 07252399.6, dated Sep. 20, 2007, 7 pp.

Written Opinion from international application No. PCT/US01/19491, mailed Jun. 11, 2002, 2 pp.

International Search Report from international application No. PCT/US01/19491, mailed Nov. 23, 2001, 3 pp.

Response to Written Opinion of Jun. 11, 2002, from PCT/US01/19491, mailed Aug. 12, 2002, 12 pp.

International Preliminary Examination Report of international application No. PCT/US01/19491, completed Dec. 1, 2002, 9 pp.

International Search Report for published application No. WO2004053772 (PCT/US03/39251), republished on Aug. 26, 2004, 3 pp.

Written Opinion of international application No. PCT/US03/39251, mailed Sep. 15, 2004, 5 pp.

International Preliminary Examination Report from international application No. PCT/US03/39251, completed May 3, 2005, 9 pp.

International Search Report mailed Nov. 4, 2004, and Written Opinion, mailed Oct. 15, 2004, for international application No. PCT/US03/39517,13 pp.
International Preliminary Examination Report for international application No. PCT/US03/39517, completed Mar. 29, 2005, 6 pp.
International Search Report and Written Opinion from international application No. PCT/US04/27165, mailed Feb. 21, 2005, 10 pp.
International Preliminary Report on Patentability from international application No. PCT/US04/27165, mailed Mar. 2, 2006, 8 pp.
International Search Report and Written Opinion from international application No. PCT/US04/03008, mailed Sep. 15, 2005, 9 pp.
International Search Report and Written Opinion from international application No. PCT/US07/68420, mailed Sep. 29, 2008, 10 pp.
International Search Report and Written Opinion from international application No. PCT/US08/55938, mailed Nov. 21, 2008, 10 pp.
Examiner Interview Summary from related case U.S. Appl. No. 09/883,779, dated Aug. 29, 2008, 2 pp.
"The Greenhouse Gas Protocol: A Corporate Accounting and Reporting Standard," World Resources Institute, Mar. 2004, 116 pp.
Dilger, "Asset Management, maintenance redefined," Manufacturing Systems 15(7): 122-128, Jul. 1997.
"Equipment Containing Ozone Depleting Substances at Industrial Bakeries," EPA, Federal Register, Feb. 2002: 67(2) 5586-5595.
Pays, "An Intermediation and Payment System Technology," Fifth International World Wide Web Conference, May 6-10, Paris, France, 1996, 12 pp.
"Compliance Guidance for Industrial Process Refrigeration Leak Repair Regulations Under Section 608 of the Clean Air Act," Oct. 1995, The Chemical Manufacturer's Association and the Environmental Protection Agency, 29 pp.
Terplan, "Web-based Systems & Network Management," CRC Press, pp. 1-43, 1999.
Air Force Refrigerant Management Program (Quinn Hart, manager), Refrigerant Management Handbook, Jun. 1994, 267 pp.
Johnson, Developing an EPA Refrigerant Regulations Compliance Program, Mar. 29, 2002. http://web.archive.org/web/20020329172323/http://www.chemalliance.org/columns/regulatory/4_20_99.asp retrieved May 13, 2004, 6 pp.
Morphy, "Life insurers, facing pressure from different directions, turn conservative," Insurance Finance & Investment, v7, n19, p. 11, Oct. 28, 2002, Dialog file 636, Accession No. 05405189, 5 pp.
Office Action received in related case U.S. Appl. No. 09/883,779 dated Jan. 27, 2005, 8 pp.
Applicant Response to Office Action dated Jan. 27, 2005, in related case U.S. Appl. No. 09/883,779, filed Jul. 1, 2005, 31 pp.
Office Action received in related case U.S. Appl. No. 09/883,779, dated Sep. 26, 2005, 7 pp.
Applicant Response to Office Action dated Sep. 26, 2005, for related case U.S. Appl. No. 09/883,779, filed Dec. 27, 2005, 9 pp.
Office Action received in related case U.S. Appl. No. 09/883,779, dated Feb. 10, 2006, 14 pp.
Applicant Response to Office Action dated Feb. 10, 2006, in related case U.S. Appl. No. 09/883,779, filed May 12, 2006, 16 pp.
Office Action received in related case U.S. Appl. No. 09/883,779, dated Jul. 17, 2006,18 pp.
Applicant Response to Office Action dated Jul. 17, 2006, in related case U.S. Appl. No. 09/883,779, filed Oct. 27, 2006, 11 pp.
Office Action received in related case U.S. Appl. No. 09/883,779, dated Dec. 14, 2006, 18 pp.
Applicant Response to Office Action dated Dec. 14, 2006, in related case U.S. Appl. No. 09/883,779, filed Apr. 16, 2007, 31 pp.
Advisory Action received in related case U.S. Appl. No. 09/883,779, dated May 25, 2007, 4 pp.
RCE filed in response to May 25, 2007 Advisory Action in related case U.S. Appl. No. 09/883,779, filed May 30, 2007, 7 pp.
Office Action received in related case U.S. Appl. No. 09/883,779 dated Jul. 5, 2007, 13 pgs.
Applicant Response to Office Action dated Jul. 5, 2007, in related case U.S. Appl. No. 09/883,779, filed Jan. 4, 2008, 14 pp.
Office Action received in related case U.S. Appl. No. 09/883,779, dated Apr. 23, 2008, 20 pp.
Applicant Response to Office Action dated Apr. 23, 2008, in related case U.S. Appl. No. 09/883,779, filed Aug. 27, 2008, 19 pp.

Office Action received in related case U.S. Appl. No. 11/431,147, dated May 9, 2008, 8 pp.
Applicant Response to May 9, 2008, Office Action, in related case U.S. Appl. No. 11/431,147, filed Aug. 11, 2008, 62 pp.
Office Action received in related case U.S. Appl. No. 10/768,957, dated Jun. 30, 2005, 5 pp.
Applicant Response to Jun. 30, 2005, Office Action, in related case U.S. Appl. No. 10/768,957, filed Oct. 27, 2005; recorded Oct. 31, 2005, 11 pp.
Office Action received in related case U.S. Appl. No. 11/357,330, dated Nov. 17, 2006, 6 pp.
Office Action received in related case U.S. Appl. No. 11/423,860, dated Jun. 18, 2007, 6 pp.
Applicant Response to Jun. 18, 2007, Office Action, in related case U.S. Appl. No. 11/423,860, filed Nov. 21, 2007, 18 pp.
Australian Application No. 20003296444 Examination Report dated Jun. 24, 2008, 3 pp.
International Preliminary Report on Patentability for international application No. PCT/US2007/068420, mailed Nov. 20, 2008, 6 pp.
California Climate Action Registry Generating Reporting Protocol, Oct. 2002, email: help@climateregistry.org; Website: http://www.climateregistry.org (149 pgs.).
California Climate Action Registry *Emissions Registry Process*, *CARROT = Climate Action Registry Reporting Online Tool, Sep. 2002 (1 pg.).
California Climate Action Registry, Charter Member Orientation, Jan. 16, 2003, Los Angeles, CA (85 pgs.).
California Climate Action Registry, Charter Member Orientation, Feb. 11, 2003, San Francisco, CA (2 pgs.).
California Climate Action Registry, New Member Orientation, Jan. 28, 2004, Bay Area Air Quality Management District, San Francisco, CA (2 pgs).
California Climate Action Registry, Carrot Getting Started Guide, CARROT V2, Apr. 2005 (8 pgs.).
California Climate Action Registry, General Reporting Protocol, Reporting Entity-Wide Greenhouse Gas Emissions, Version 2.0, Apr. 2006 (112 pgs.).
Office Action received in related U.S. Appl. No. 12/233,897, dated Jun. 29, 2009, 18 pp.
Response to European Office Action of Jan. 19, 2009, from related European application No. 07252399.6, dated Jun. 25, 2009, 10 pp.
Response to Office Action of Jun. 29, 2009, from related U.S. Appl. 12/233,897, filed Jul. 2, 2009, 7 pp.
Response to Written Opinion of Sep. 15, 2004, from PCT/US03/39251, dated Dec. 15, 2004, 10 pp.
Voluntary Amendment filed Mar. 24, 2009, in related Canadian Application 2651410, 7 pp.
McLean, Brian, "The US Allowance Tracking System", 4th Session of the Greenhouse Gas Emissions Trading Policy Forum, Jul. 30, 2000, Denver, CO, 3 pp.
Heriszt, L., "The Energy Information System as Basis for Communal Planning", Presented at the European Conference VIII, Geographic Information Systems and the European Challenge, Oct. 7-9, 1992 Montreux, Switzerland by AM/FM International—European Division, with English translation, 15 pp.
International Search Report and Written Opinion Issued in PCT/US2009/60226, mailed Jul. 12, 2010, 12 pages.
Petition Under 37 CFR 1.78(a)(2) in U.S. Appl. No. 10/429,619, filed Jul. 21, 2004, 2 pages.
Response to Decision on petitions Under 37 CFR 1.78(a) and Under 37 CFR 1.78(a)(6), in U.S. Appl. No. 10/429,619, filed Feb. 11, 2005.
Decision on Renewed Petition in U.S. Appl. No. 10/429,619, mailed Apr. 14, 2005.
Non-Final Office Action issued in U.S. Appl. No. 10/429,619, mailed Sep. 25, 2006.
Amendment and Response to Office Action mailed Sep. 25, 2006 in U.S. Appl. No. 10/429,619, dated Jan. 25, 2007.
Notice of Allowance issued in U.S. Appl. No. 10/429,619, mailed Apr. 24, 2007.
Renewed Petition Under 37 CFR 1.78(a)(3) in U.S. Appl. No. 10/429,619, filed Jun. 15, 2007.
RCE and Preliminary Amendment filed Jul. 24, 2007 in U.S. Appl. No. 10/429,619.

Second Preliminary Amendment in U.S. Appl. No. 10/429,619, dated Jul. 25, 2007.
Non-Final Office Action issued in U.S. Appl. No. 10/429,619, mailed Sep. 19, 2007.
Amendment and Response to Office Action mailed Sep. 19, 2007 in U.S. Appl. No. 10/429,619, dated Dec. 18, 2007.
Examiner's Interview Summary issued in U.S. Appl. No. 10/429,619, mailed Dec. 27, 2007.
Final Office Action issued in U.S. Appl. No. 10/429,619, mailed Mar. 21, 2008.
RCE and Amendment filed Sep. 8, 2008 in U.S. Appl. No. 10/429,619 in response to Final Office Action mailed Mar. 21, 2008.
Notice of Allowance issued in U.S. Appl. No. 10/429,619, mailed Oct. 6, 2008.
RCE filed Oct. 10, 2008 in U.S. Appl. No. 10/429,619.
Notice of Allowance issued in U.S. Appl. No. 10/429,619, mailed Jan. 21, 2009.
Notice of Allowance issued in U.S. Appl. No. 10/768,957, mailed Nov. 17, 2005.
Decision on Petition to accept an unintentionally delayed claim filed Feb. 11, 2005 in U.S. Appl. No. 10/768,957, dated Apr. 11, 2005.
Response to Decision on petitions Under 37 CFR 1.78(a) and Under 37 CFR 1.78(a)(6), in U.S. Appl. No. 10/768,957, mailed Feb. 8, 2005.
Decision on Petition filed Jul. 21, 2004 in U.S. Appl. No. 10/768,957, dated Dec. 2, 2004.
Notice of Allowance issued in U.S. Appl. No. 11/423,860, mailed Jan. 28, 2008.
Supplemental Notice of Allowance and Response to Rule 312 Communication issued in U.S. Appl. No. 11/744,713, mailed Aug. 5, 2008.
Notice of Allowance issued in U.S. Appl. No. 11/744,713, mailed Jul. 3, 2008.
Amendment and Response to the Office Action mailed Feb. 8, 2008 in U.S. Appl. No. 11/744,713, dated May 5, 2008.
Non-Final Office Action issued in U.S. Appl. No. 11/744,713, mailed Feb. 8, 2008.
Preliminary Amendment Under 37 CFR 1.57(a) issued in U.S. Appl. No. 11/744,713, dated Jul. 27, 2007.
Notice of Allowance issued in U.S. Appl. No. 12/042,917, mailed May 12, 2010.
Notice of Allowance issued in U.S. Appl. No. 12/042,917, mailed Jul. 21, 2010.
Notice of Allowance mailed Sep. 8, 2009, in U.S. Appl. No. 12/233,897, 4 pp.
Supplemental Notice of Allowance mailed Nov. 23, 2009 in U.S. Appl. No. 12/233,897, 4 pages.
Supplemental Notice of Allowance mailed Oct. 9, 2009 in U.S. Appl. No. 12/233,897.
International Search Report and Written Opinion Issued in PCT/US2009/066225, mailed Mar. 1, 2010, 14 pages.
Communication from European Patent Office issued in EP 07252399, dated Jan. 19, 2009.

* cited by examiner

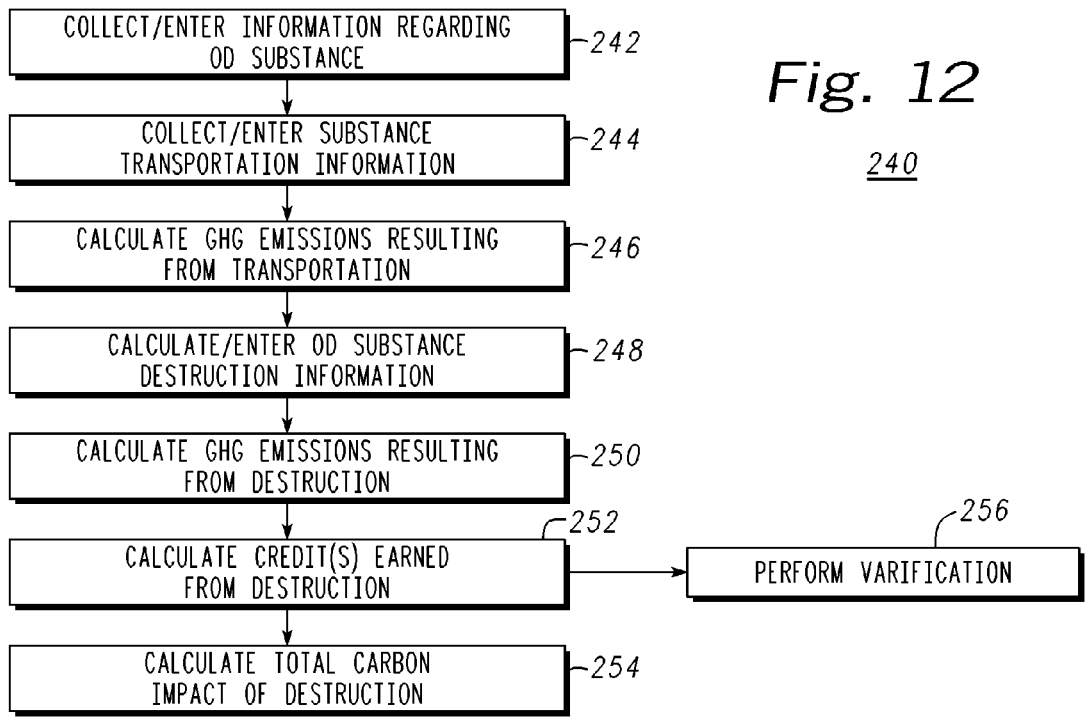

METHOD AND SYSTEM FOR TRACKING AND MANAGING DESTRUCTION, RECONSTITUTION, OR RECLAMATION OF REGULATED SUBSTANCES

CROSS-REFERENCE TO RELATED APPLICATIONS

This application is a continuation-in-part of U.S. patent application Ser. No. 12/042,917, filed Mar. 5, 2008, entitled "Method and System for Tracking and Managing Various Operating Parameters of Enterprise Assets," and further is a continuation-in-part of U.S. patent application Ser. No. 11/744,713, filed May 4, 2007, entitled "Method and System for Tracking and Reporting Emissions," which claims priority to U.S. Patent Application No. 60/893,261, filed Mar. 6, 2007, entitled "Emissions Tracking and Reporting," all of which are hereby incorporated herein by reference in their entireties. Further, this application is a continuation-in-part of U.S. patent application Ser. No. 11/423,860, filed Jun. 13, 2006, entitled "Enterprise Energy Management System," which issued as U.S. Pat. No. 7,369,968 on May 6, 2008, which is a continuation-in-part of U.S. patent application Ser. No. 10/768,957, filed Jan. 30, 2004, entitled "Enterprise Energy Management System," which issued as U.S. Pat. No. 7,062,389 on Jun. 13, 2006, which claims priority to U.S. Patent Application No. 60/444,091, filed Jan. 31, 2003, entitled "Enterprise Energy Management," all of which are hereby incorporated herein by reference in their entireties. In addition, this application is a continuation-in-part of U.S. patent application Ser. No. 10/429,619, filed May 5, 2003, entitled "Refrigerant Loss Tracking and Repair," which claims priority to U.S. Patent Application No. 60/432,120, filed Dec. 9, 2002, entitled "Refrigerant Loss Tracking and Repair," both of which are hereby incorporated herein by reference in their entireties.

FIELD

The field of the various embodiments disclosed herein relates generally to enterprise asset management and more specifically to systems and methods for tracking and managing various parameters of an enterprise, including any combination of energy consumption, GHG emissions, carbon valuations such as carbon credits, and/or costs associated with one or more pieces of equipment, one or more sites, or the entire enterprise. Another embodiment relates to systems and methods for tracking and managing the destruction of regulated substances, including calculating the overall carbon impact of the destruction. Further embodiments relate to systems and methods for calculating total costs and/or optimizing the various parameters above.

BACKGROUND

Gases that trap heat in the atmosphere are often called greenhouse gases (GHGs). GHGs are believed to be a significant contributor to the global warming phenomenon. Some GHGs such as carbon dioxide occur naturally and are emitted to the atmosphere through natural processes. Other GHGs are created and emitted solely through human activities. The principal GHGs that enter the atmosphere because of human activities are: carbon dioxide ($CO_2$), methane ($CH_4$), nitrous oxide ($N_2O$), and fluorinated gases such as hydrofluorocarbons, perfluorocarbons, and sulfur hexafluoride. In addition, GHGs can include at least some types of chlorinated gases.

Many governments are taking steps to reduce GHG emissions through national policies that include the introduction of emissions trading programs, voluntary programs, carbon or energy taxes, and regulations and standards on energy efficiency and emissions. As a result of such political and legislative initiatives in the United States and abroad, organizations are increasingly required to track and report their GHG emissions. Such emissions tracking and reporting can be arduous when it must be conducted for a multi-site organization or enterprise which exists across a wide geography. For example, a large retail chain may have hundreds of sites across the United States, with each site containing hundreds of sources of GHG emissions.

The creation of the emissions trading programs has created a market in which companies can trade in units called "carbon credits." Thus, companies can create an additional source of profits by reducing their GHG emissions. More specifically, a company can reduce its GHG emissions, gain carbon credits as a result of the emissions reduction, and then sell those credits in the open market for a profit.

Accordingly, there is a need in the art for a system or method for expeditiously and efficiently tracking and reporting the GHG emissions and the resulting carbon credits or any other type of carbon valuation that may be used to motivate entities or people to reduce damaging emissions or use of environmentally damaging assets, products, or processes.

BRIEF SUMMARY

Certain embodiments disclosed herein relate to a network-based system for managing the destruction of a regulated substance. The system has a central processor, a database, emissions tracking software, carbon valuation tracking software, and total carbon impact software. The database is configured to store emissions information, energy consumption information, and carbon valuation information. The emissions tracking software is configured to calculate and track emissions information relating to the transportation and destruction of the at least one regulated substance. The carbon valuation software is configured to calculate and track the carbon valuation information relating to the destruction of the at least one regulated substance. Further, the total carbon impact software is configured to calculate and track total carbon impact information relating to the destruction of the at least one regulated substance.

Another embodiment relates to a network-based system for managing the destruction of a regulated substance. The system has a central processor, a database, emissions tracking software, carbon valuation tracking software, and verification software. The database is configured to store emissions information, energy consumption information, and carbon valuation information. The emissions tracking software is configured to calculate and track emissions information relating to the transportation and destruction of the at least one regulated substance. The carbon valuation software is configured to calculate and track the carbon valuation information relating to the destruction of the at least one regulated substance. Further, the verification software is configured to transmit verification information comprising verification of the destruction of the at least one regulated substance to any third party verifier or verification entity.

A further embodiment relates to a network-based system for managing the destruction of a regulated substance. The system has a central processor, a database, emissions tracking software, carbon valuation tracking software, comparison software, and analysis software. The database is configured to store emissions information, energy consumption information, and carbon valuation information. The emissions tracking software is configured to calculate and track emissions information relating to the transportation and destruction of the at least one regulated substance. The carbon valuation software is configured to calculate and track the carbon valuation information relating to the destruction of the at least one regulated substance. Further, the comparison software is configured to compare and calculate a difference between the emission information and the carbon valuation information relating to the transportation and destruction of the at least one regulated substance. In addition, the analysis software is configured to identify at least one operating adjustment to at least one of transportation and destruction of the at least one regulated substance if all emissions associated with the transportation and destruction exceed all emissions allowed by any positive carbon valuation earned by the destruction of the at least one regulated substance.

While multiple embodiments are disclosed, still other embodiments will become apparent to those skilled in the art from the following detailed description, which shows and describes illustrative embodiments of the invention. As will be realized, the invention is capable of modifications in various obvious aspects, all without departing from the spirit and scope of the inventions described herein. Accordingly, the drawings and detailed description are to be regarded as illustrative in nature and not restrictive.

BRIEF DESCRIPTION OF THE DRAWINGS

FIG. 12 is a flow chart illustrating a method of tracking and managing the destruction of ozone depleting substances, including GHG emissions and carbon credits associated with such destruction.

FIG. 13 is a flow chart illustrating the generating of an emission report, according to one embodiment.

DETAILED DESCRIPTION

Various embodiments of methods and systems described herein relate to tracking and/or managing any combination of energy consumption, GHG emissions, carbon valuation such as carbon credits, and/or costs associated with one or more pieces of equipment or ozone-depleting substances, one or more sites, or an entire enterprise.

Figure 1:
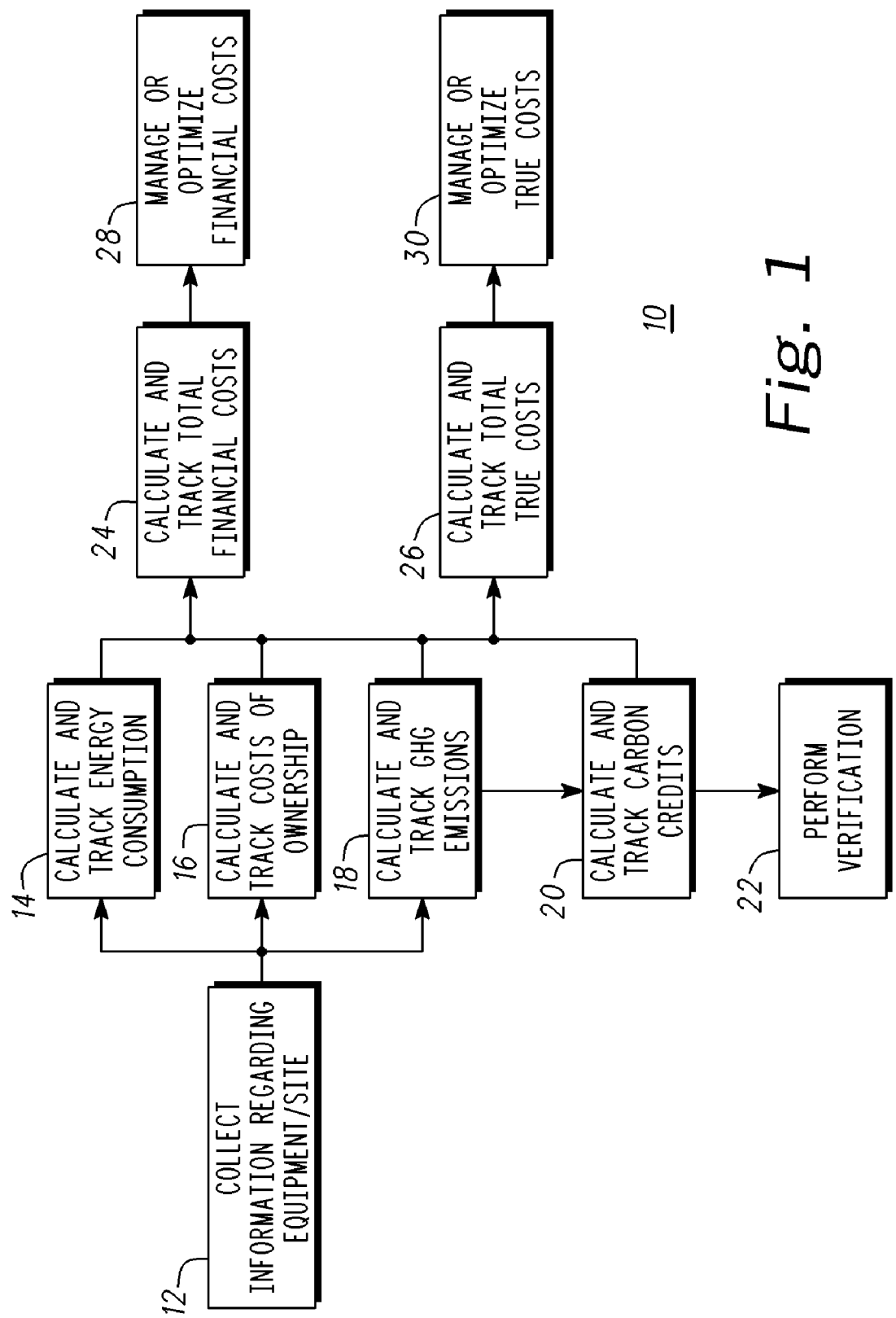
FIG. 1 is a flow chart illustrating the operation of an energy consumption, costs, emissions, and carbon valuation tracking and management system, in accordance with one embodiment.

FIG. 1 is a flow chart depicting the overall operation of a method and system for tracking and, in some embodiments, managing, energy consumption, costs, emissions, and/or carbon valuation (such as carbon credits), of an enterprise 10, according to one embodiment. The system 10 generally comprises calculating and tracking energy consumption of at least one piece of equipment at least one site (block 14), calculating and tracking ownership costs of at least one piece of equipment at the at least one site (block 16), calculating and tracking GHG emissions of at least one piece of equipment at the at least one site (block 18), and calculating and tracking carbon credits (or any carbon valuation) relating to the at least one piece of equipment at the at least one site (block 20).

Continuing with FIG. 1, in one aspect, the system 10 can also perform "verification" (block 22), which is a process for confirming emissions reduction compliance as required under carbon valuation regimes in order to be awarded certain credits, which will be described in further detail below. In an alternative embodiment, the system 10 can also provide for calculating and tracking the total financial costs for at least one piece of equipment at the at least one site (block 24) based on the energy consumption, costs of ownership, GHG emissions, and carbon credits (or any other carbon valuation) of the at least one piece of equipment. In a further embodiment, the system 10 can provide for calculating and tracking the total "true costs" (which can include financial, environmental, and even public relations costs as described in further detail herein) for at least one piece of equipment at the at least one site (block 26) based on the energy consumption, costs of ownership, GHG emissions, and carbon valuation of the at least one piece of equipment. In yet another alternative implementation, the system 10 can also allow for managing or optimizing the financial or true costs (blocks 28, 30) as will be described in further detail herein. Alternatively, the calculating and tracking capabilities can be used to manage and/or help with developing a strategy for procurement of various pieces of equipment, such as for one or more sites or for the entire enterprise, as will be described in further detail herein. In another alternative implementation, the calculation and tracking capabilities set forth herein can also be utilized to track and calculate energy consumption and GHG emissions required over the life of a retail product or service to determine and/or track a "carbon footprint" for that product or service, as will also be described in further detail herein. As used herein, "carbon footprint" or "carbon impact" is intended to mean any measure of an item's impact on the environment resulting from the presence of GHG or GHG emissions, including, for example but not limited to, one or more of emissions produced during use of the item, emissions produced in production or creation of the item, and/or emissions produced in transportation of the item.

Thus, the calculating and tracking of the energy consumption, equipment costs, GHG emissions, and carbon credits (or any type of carbon valuation) of the various embodiments described herein can be used in a variety of different ways to track and/or manage the operation of one or more pieces of equipment, one or more sites, or an entire enterprise, as will be explained in further detail below.

It is understood that the equipment or sites tracked by the various systems and methods described herein can be any type of equipment or sites utilized by any entity with an interest in such tracking, calculation, and or management as described herein. In one embodiment, the equipment and multiple sites are those of a commercial entity that utilizes one of the systems or methods described herein to track or manage the entity's financial and/or true costs of operation at each site and overall. One specific, non-limiting example is a grocery store chain that may utilize one system embodiment as described herein to calculate, track, and manage the total financial costs of its equipment at every grocery store site, such as refrigerators, freezers, cash registers, lighting, HVAC, fleet vehicles, and any other equipment that consumes energy, emits any GHG gas, or otherwise can be tracked and managed.

Further specific, non-limiting examples of energy consuming equipment can include equipment consuming electrical energy, equipment combusting hydrocarbon energy sources (e.g., natural gas or propane), equipment consuming both, or any other energy-consuming or utility service-utilizing equipment as described herein, including equipment that consumes, utilizes, or is powered by electricity. In one embodiment, equipment using water is also included. Further, the equipment can also include any equipment that consumes or utilizes phone service, cable television service, high-speed internet service, or any other device that consumes, utilizes, or is powered by electronic or energy services.

A further specific, non-limiting example of an item that can be tracked and managed by any of the systems disclosed herein is any regulated substance as defined elsewhere herein, including tracking and managing the destruction of the substance along with any GHG emissions associated with the transportation and destruction and any carbon valuation (such as carbon credits) accumulated (or reduced in the case of a carbon tax) as a result of the destruction.

System Components

Figure 2:
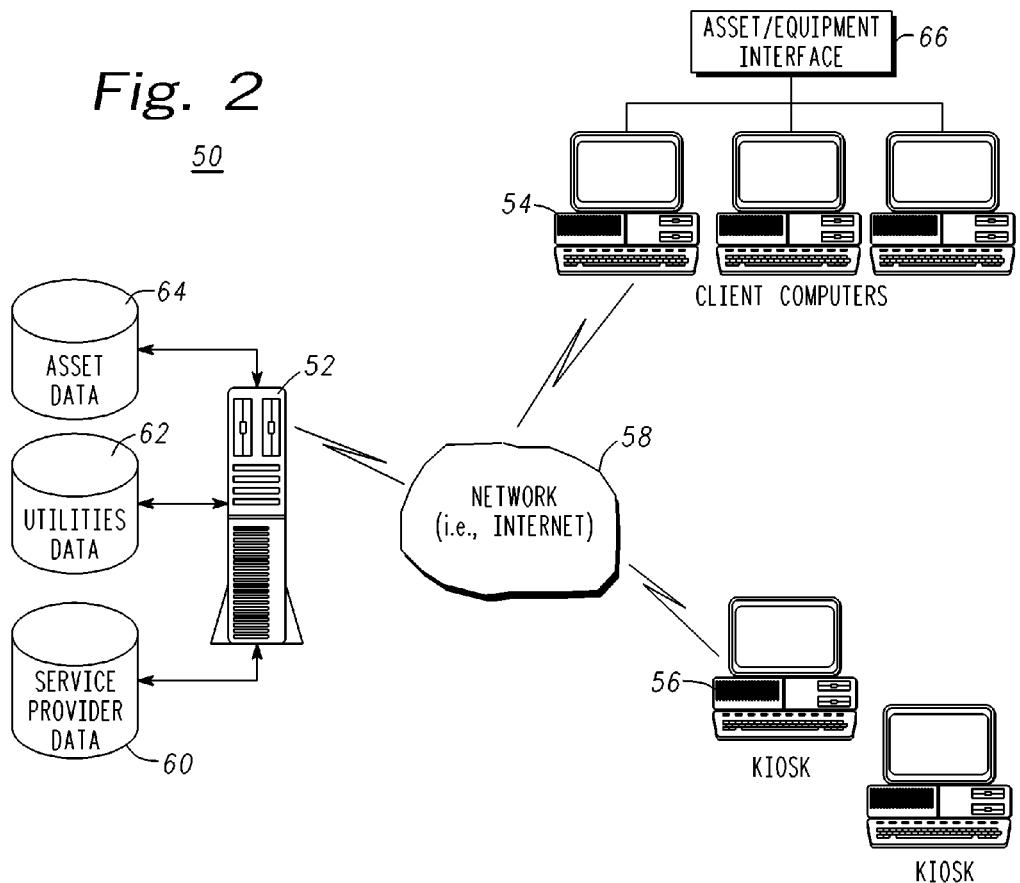
FIG. 2 is a block diagram of an asset tracking and management system configuration, in accordance with one embodiment.

FIG. 2 depicts a schematic diagram of one embodiment of a network-based system for calculating, tracking, and/or managing such parameters as energy consumption, GHG emissions, ownership costs, and carbon valuation for one or more pieces of equipment, one or more sites, one or more regions, or an entire enterprise. Further systems that could be utilized with the tracking and management embodiments described herein are disclosed in co-pending U.S. patent application Ser. No. 09/883,779, entitled "Method and System for Managing Enterprise Assets," filed on Jun. 18, 2001, which is hereby incorporated herein by reference in its entirety.

As shown in FIG. 2, the system 50 according to one embodiment can include a server 52 in communication with client computers 54 and/or kiosks 56 through a network 58. The client computers 54 and/or kiosks 56 can be located at one or more of the various distributed sites of a distributed enterprise or could be located at other locations, such as third party sites. "Client computers" as used herein shall mean any known type of processor or computer, and can also be referred to as site processors 54 or site computers 54. The system 50 allows a distributed enterprise to track and/or manage assets, energy consumption, emissions, equipment costs, and carbon valuation at one or more of multiple sites.

As further shown in FIG. 2, according to one implementation, the server 52 is in communication with at least one of an asset database 64, a service provider database 60, and a utilities database 62. According to one embodiment, the asset database 64 contains information regarding each piece of equipment, such as equipment identification, description, base cost, historical maintenance and service information, or any other kind of information relating to a piece of equipment. Further, asset database 64 also include information relating to energy consumption information, emissions information, and carbon valuation information (such as carbon credit or carbon tax information) for each piece of equipment. The service provider database 60 contains various information regarding service providers. Further, the utilities database 62 contains information about various utility or energy providers that provide utilities or energy to at least one site of the enterprise.

Alternatively, various embodiments of the system described herein can have separate databases for various different kinds of asset information such as an energy consumption database, an emissions database, and a carbon valuation database. In a further alternative, the asset or equipment data, service data, utilities data, energy consumption data, emissions data, and carbon valuation data are maintained in a single database.

It is understood that the server or central processor 52 (also referred to herein as an "enterprise processor") can be any computer known to those skilled in the art. In one embodiment, the central processor 52 includes a website hosted in at least one or more computer servers. It is understood that any system disclosed herein may have one or more such server 52 and that each server may comprise a web server, a database server and/or application server, any of which may run on a variety of platforms.

According to one embodiment, the enterprise processor or processors 52 comprise a central processor unit ("CPU") and main memory, an input/output interface for communicating with various databases, files, programs, and networks (such as the Internet), and one or more storage devices. The storage devices may be disk drive devices or CD-ROM devices. The enterprise processor 52 may also have a monitor or other screen device and an input device, such as a keyboard, a mouse, or a touch sensitive screen. Some non-limiting commercial examples of servers that could be used with various embodiments disclosed herein include Dell 2950, Sun Solaris, HP 9000 series, and IBM x3000 series.

In one implementation, the central processor 52 includes software programs or instructions that run on the server-side to process requests and responses from a client computer 54. These software programs or instructions send information to the client computer 54, perform calculation, compilation, and storage functions, transmit instructions to the client computer 54 or to one or more pieces of equipment, and generate reports. It is understood that any embodiment of the systems disclosed herein that provide for data collection, storage, tracking, and managing can be controlled using software associated with the system. It is further understood that the software utilized in the various embodiments described herein may be a software application or applications that are commercially sold and normally used by those skilled in the art or it may be a specific application or applications coded in a standard programming language.

It is further understood that the software can be any known software for use with the systems described herein to track, calculate, and manage the various parameters as described herein. For example, as described in further detail herein, various embodiments of the systems described herein could have any one or more of software for tracking energy consumption, ownership costs, GHG emissions, carbon valuation (such as carbon credits), total financial costs, or total true costs of one or more assets, locations, regions, or enterprise, or software allowing for optimization of any one of these parameters.

The central processor 52 allows access by the client processor 54 to various network resources. In one embodiment, the central processor 52 also has access, via the network 58 or some other communication link, to external data sources that may be used to keep the information in the server current. In one implementation, a number of site computers 54 may be connected to the server at any given time, and therefore a number of an enterprise's facilities or locations may utilize the system simultaneously.

In the system 50, generally, equipment data (such as, for example, energy consumption data, emissions data, or carbon valuation data) entered into the system 50 via a client computer or processor 54 and/or equipment interface 66 is received by the server 52 and stored in the asset database 64. Alternatively, it can be stored in any of the appropriate databases of the system.

The databases 60, 62, 64 serve as the inputs to and information storage for the management and tracking system 50, which processes the information as described below and generates any one or more of notifications, reports, work orders, predictive analysis, suggested actions, and/or instructions to a user or to a piece of equipment or a third party system.

According to one embodiment, the databases 60, 62, 64 may be of any type generally known in the art. The databases 60, 62, 64 may be integral to the central processor 52 or they may be accessible to the central processor 52 through a computer network or other suitable communication link. In one embodiment, the databases 60, 62, 64 are comprised of a plurality of database servers, some of which are integral to the central processor 52, and some that are located remotely from the central processor 52. Some non-limiting commercial examples of databases that could be used with various embodiments disclosed herein include Oracle 9i, Oracle 10 g, Microsoft SQL Server, PostSQL, and Ingress.

The asset or equipment database 64 includes general asset information relating to each asset in the system and service information for each asset. As used herein, "asset" is intended to include any item or piece of equipment that an enterprise might have an interest in tracking or managing, such as an energy-consuming asset, a GHG-emitting asset, or a regulated substance (as defined elsewhere). The asset information may include site information relating to all sites where the client has assets, including site location, identification of assets at the site, and other relevant site information. The asset information may also include manufacturer information, supplier information, warranty information, and any other relevant information for each asset. If the asset is one part of a system comprised of more than one asset, the asset information may include system information, including the system name, description of the system, identification of the assets in the system, system status, along with any other relevant information. The system status options may include, for example and without limitation, normal operation, provisional operation, under repair, or being retrofitted.

As discussed above, the asset or equipment database according to one embodiment can also include the energy consumption information, emissions information, ownership cost information, and carbon valuation information for each asset. Alternatively, one or more of the energy consumption information, the emissions information, ownership cost information, and the carbon valuation information can be stored in separate databases as described above.

Figure 3:
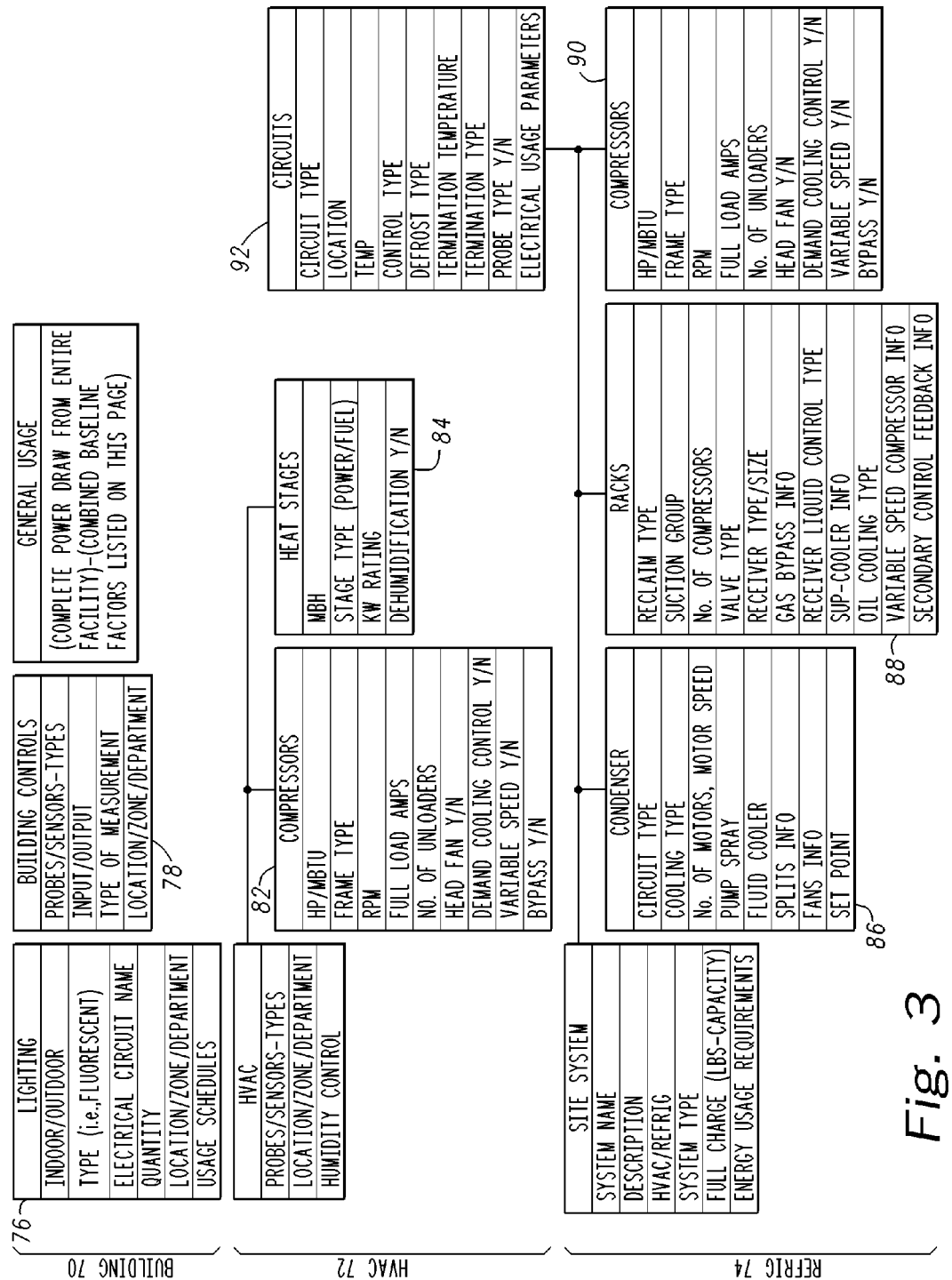
FIG. 3 is a diagram showing various examples of information relating to energy consuming assets collected, according to one embodiment.

According to one embodiment, the energy consumption information includes any energy consumption information relating to any piece of equipment of an enterprise or location that consumes energy. Further, the energy consumption information varies depending on the type or category of equipment. In one non-limiting example, the information collected for various types of equipment is depicted in FIG. 3, according to one exemplary embodiment of the invention. As shown in FIG. 3, the exemplary equipment may be placed into three categories, namely building 70, HVAC 72, and refrigeration 74. The embodiment of FIG. 3 further categorizes building 70 into lighting 76, building controls 78 and general usage 80. As shown, HVAC 72 is further categorized into compressors 82 and heat stages 84, and refrigeration 74 is further categorized into condensers 86, racks 88, compressors 90, and circuits 92. FIG. 3 further shows several exemplary, non-limiting fields of information that may be collected for each type of equipment.

In one implementation, the emissions information includes any emissions information relating to any piece of equipment of an enterprise or location that emits greenhouse gases. Such information can include any information relating to the amount of emissions produced by an asset. In one example, the emissions information may include historical emissions data, including direct, indirect, and fugitive emissions data, site emissions data, and, in some embodiments, group emissions data. Alternatively, the information can include any emissions information of any kind. The emissions information can be organized within the asset database 64 (or another appropriate separate database) or retrieved from the database 64 according to the piece of equipment, according to site, or any other desired parameter. That is, the information can be stored or retrieved on a per-site basis, a per-asset basis, or any other basis.

As used herein, "fugitive emissions" is intended to mean any emission that is unintended, unplanned, and/or undesirable, such as, for example, gas leakage (such as refrigerant leakage) from an asset. According to one embodiment, emissions associated with an regulated substance, including any potential emissions if and when the substance is destroyed, can be considered fugitive emissions. With respect to fugitive emissions data, the fugitive emissions data can include work order data such as information relating to repairs of the equipment emitting the fugitive gas, which can be used to calculate fugitive emissions such as refrigeration leaks. It is understood that any refrigeration leakage information or any other type of leakage information relating to GHG as described herein can constitute emissions information.

The carbon valuation information, in accordance with one embodiment, includes any carbon valuation information (such as, for example, carbon credit information) relating to any piece of equipment of an enterprise or location that emits greenhouse gases or otherwise has a carbon footprint. In one example, the carbon valuation information may include historical carbon valuation data such as historical carbon credit data. Alternatively, the information can include any carbon valuation data of any kind. The carbon valuation information can be organized within the asset database 64 (or another appropriate separate database) or retrieved from the database 64 according to the piece of equipment, according to site, or any other desired parameter. That is, the information can be stored or retrieved on a per-site basis, a per-asset basis, or any other basis.

According to one exemplary embodiment, if the asset is a piece of refrigeration equipment, the asset database 64 includes refrigeration equipment information, repair, retrofit, or retirement information, and refrigerant information. The refrigeration equipment information may include identification of the type of refrigeration equipment. For example, the asset may be HVAC equipment. The refrigeration equipment information may also include an EPA category, certification type required of the service provider by the EPA, the amount of refrigerant when the asset is fully charged, the refrigerant charge determination method, the refrigerant type, the refrigerant circuit the equipment is associated with, refrigerant destruction information, all past work orders (including the amount of refrigerant used) that have been performed on the system, or any assets attached to the system, such as refrigerated cases or HVAC systems, and any other relevant information. Some options for the refrigerant charge determination method may include measurement, calculation, manufacturer's information, or establish range. Examples of refrigerant type include R-22, 12/152a blend, 22/115 blend, and 401A (MP39).

Further, the database 64 can include any additional information known to be useful in asset management.

In one embodiment, the utilities database 62 includes information about various utility providers that provide utilities to at least one site of the enterprise. For example, the utility providers can include, but is not limited to, providers of electricity, gas, water, sewage systems, phone service, cable television service, high-speed internet service, and any other provider of electronic or energy services. In one embodiment, the database 62 further includes a roster of contacts for each utility provider, including, according to one embodiment, service technicians for each utility provider. In accordance with one aspect of the invention, the database 62 further includes for each utility provider a list of billing-related and service-related incentives, rebates, discounts, or any other form of money-saving package or offer offered to customers by the utility provider. For each money-saving package or offer, the specific condition(s) or event(s) that must be satisfied such that the package or offer can be redeemed or cashed in or otherwise obtained by a customer are also included in the database.

The service provider database 60 includes general service and/or maintenance provider information and certification information for each service provider available to service an asset and each maintenance provider available to provide maintenance for an asset. "Service," as used herein, is intended to encompass any type of repair, maintenance, or any other type of service that can be performed on, applied to, or otherwise provided for any type of asset. Further, "service provider," as used herein, is intended to mean any person or entity that provides some type of repair or maintenance or any other known type of service for any type of asset. The information may include the name of the service and/or maintenance provider, a description, an address, a phone number, a mobile phone number, a fax number, an e-mail address, a username and password to log onto the system, one or more technician names, contact information for each technician, and any other relevant information. The certification information may include a qualification type, a certificate number, an expiration date for the certificate, a status, and any other relevant information. According to one embodiment, the certification information is associated with technicians.

In the embodiment depicted in FIG. 2, the client computers 54 are in communication with individual pieces of equipment through an asset/equipment interface 66. The equipment interface 66 can be configured to communicate with the equipment and to provide a communication link between the equipment and an enterprise processor 54 or the central processor 52. In one embodiment, various interfaces 66 are configured to accept input from direct or fugitive emissions sensors on various pieces of equipment, in order to monitor the emissions production of each emission source. In one exemplary embodiment, the equipment interface to an emission sensor is an interface with a continuous emissions monitoring system such as the Baldwin™ Series Classic Thermo-Electric Cooler, available from Perma Pure LLC, located in Toms River, N.J. In further embodiments, the interface 66 is configured to accept input from one or more energy consumption sensors on the piece of equipment with which the interface 66 is associated.

According to one implementation, the interface 66 is a local area wired or wireless network. In one aspect, the interface 66 includes software to translate and normalize signals received from various types of equipment, similar to that disclosed in co-pending U.S. patent application Ser. No. 10/734,725, filed on Dec. 12, 2003, which is hereby incorporated herein by reference in its entirety.

In one aspect of the invention, an interface 66 associated with a particular piece of equipment allows for collection of information, including real-time information, directly from the piece of equipment. Further, the information collected from the asset or piece of equipment can then be used in the present system in any fashion taught herein. In one example, the information collected by the appropriate interface 66 can be used to calculate energy consumption, emissions, or carbon valuation such as carbon credits relating to the piece of equipment, the site, or the enterprise, according to one embodiment. In a further example, the interface 66 could be coupled to an HVAC system to collect various information about the HVAC system such as equipment information, service information, energy consumption information, and/or emissions information (including fugitive emissions information).

Tracking and Management

As mentioned above, any embodiment of the systems described above can be used to calculate, track, and manage at least one of energy consumption, ownership costs, GHG emissions, and carbon valuation (such as carbon credits or carbon taxes) for a piece of equipment, a site, or an enterprise. For example, according to one embodiment, the energy consumption for a piece of equipment, site, or enterprise can be tracked and managed, including identifying and implementing optimal consumption parameters. Similarly, in further exemplary embodiments, either or both of GHG emissions and carbon valuation can be tracked, managed, or optimized for a piece of equipment, site, or enterprise. In further embodiments relating to the tracking and/or management of carbon valuation such as carbon credits or taxes, the system can also provide for a verification process for verifying compliance with previously established emissions reduction goals, including verification processes required by various carbon valuation tracking regimes worldwide. In yet another embodiment, the system can track and manage the destruction of any regulated substance, including tracking transportation and destruction of the substance, tracking the GHG emissions relating to both the transportation and destruction, tracking the carbon valuation such as carbon credits accumulated as a result of the destruction (or any type of carbon tax avoided by the destruction, etc.), and calculating a total carbon impact of the destruction.

In accordance with other embodiments, the system allows for tracking (and managing and/or optimizing in certain embodiments) total financial costs of a piece of equipment, a site, or an enterprise, wherein the total financial costs incorporate all ownership and/or operational costs, all financial costs associated with GHG emissions, and all financial implications of any carbon valuation such as carbon credits or a carbon tax. In further embodiments relating to tracking total financial costs, the system allows for planning, tracking, and/or managing a procurement project relating to procurement of one or more pieces of equipment, all equipment for a site, or all equipment for an enterprise. Further, in additional embodiments, the system allows for tracking total or "true" costs of a piece of equipment, a site, or an enterprise, wherein such true costs can include all operational and/or ownership costs such as all energy consumption costs, all environmental costs such as all GHG emissions, and all public relations costs such as those related to the financial and environmental impacts of the asset, site, or enterprise. Further, such tracking, management, and/or optimization of total costs could be used for a procurement project as described above as well. According to further alternative embodiments, the system allows for tracking, managing, and/or optimizing any of the above parameters for one or more retail products or services.

Data Collection/Organization

According to various embodiments of the methods and systems disclosed herein, as an initial procedure, information about at least some assets or pieces of equipment is collected and stored in the system. It is understood that this collection or organization of existing information is an initial step to input information into or capture such information in the various embodiments of the systems described herein.

In one embodiment, at least one asset is inventoried and an asset identifier created for each asset to give it a trackable identity. This approach can provide a uniform naming convention, such that the same asset is identified by the same name or identification number each time it is entered into the system. In another embodiment, a set of appropriate data fields is associated with each asset wherein each field has a set of acceptable attributes. In this fashion, certain information specific to certain types of assets can be collected and, according to certain embodiments, only that appropriate information can be entered into the system.

Once an identifier and data fields have been created for each piece of equipment, information relating to each asset can be collected. That is, certain characteristics or information of each trackable asset may be associated with the identifier. According to one embodiment, the process of collecting and storing information relating to assets located at a site is implemented using or in conjunction with a method or system for surveying equipment assets located at a site or at multiple distributed sites. One example of such a system is disclosed in co-pending U.S. patent application Ser. No. 10/771,090, entitled "Site Equipment Survey Tool," filed on Feb. 3, 2004, which is incorporated herein by reference in its entirety.

Figure 4:
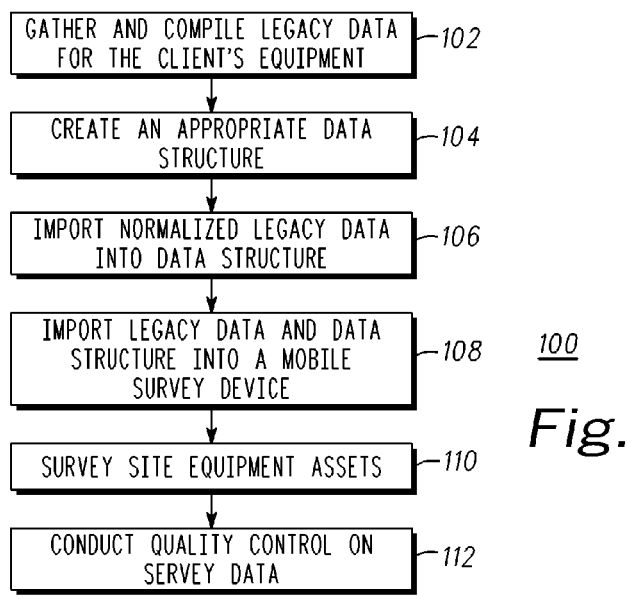
FIG. 4 is a flow chart illustrating a method of surveying and collecting information for a tracking and management system, in accordance with one embodiment.

FIG. 4 is a flow chart showing one embodiment of an equipment surveying method 100 that includes gathering and compiling legacy data for a client's equipment assets (block 102), creating an appropriate data structure for collecting and storing equipment information (block 104), importing normalized legacy data into the data structure (block 106), importing the data structure and the legacy data (block 108), and surveying site equipment assets to collect relevant information (block 110). In one embodiment, a quality control review is conducted on the collected survey data (block 112).

Figure 5:
FIG. 5 is a flow chart illustrating the collecting and entering of information into a tracking and management system, in accordance with one embodiment.

Regardless of whether a survey method is used or not, FIG. 5 is a flow chart illustrating an exemplary embodiment of a process of collecting and entering asset data 120, according to certain embodiments. As shown in FIG. 5, in certain embodiments, a user identifies an asset for which information is to be collected (block 122). Alternatively, there is no need to identify the asset because information is collected for all assets at a location. In some embodiments, based on the type of asset identified, information corresponding to the identified asset is collected (block 124). After asset information is gathered, the information is input into the system and associated with the appropriate asset (block 126). In one embodiment, the asset information is collected and/or entered into the system on a periodic basis.

As discussed above with respect to the various databases that can be incorporated into various embodiments of the system, various types of equipment information can be collected and entered into or stored in the system. It is understood that the information to be collected can depend on the type of equipment or the type of site at which the asset is located. Thus, the asset information can include energy consumption information for each asset, ownership cost information for each asset, GHG emissions information for each asset, and/or carbon valuation information for each asset. It is also understood that the information can be organized on a per-asset basis, a per-site basis, a per-region basis, a per-enterprise basis, or any other logical basis. For example, organizing information on a per-site basis allows for consideration of all asset information at a site and processing of that information for purposes described herein. Alternatively, organizing the information on a per-asset basis, a per-enterprise basis, or a per-region basis is also useful as described herein.

Tracking or Managing Energy Consumption

According to one embodiment, any system embodiment described herein can be used for energy management methods such as calculating, tracking, and/or managing energy consumption of one or more assets. One exemplary embodiment includes first collecting relevant information relating to each energy consuming asset and then collecting actual energy consumption data on a periodic basis for each asset. Using this periodically collected information, the actual energy consumption of each asset can be tracked over time and utilized by various embodiments of the system as described herein to manage the energy consumption of each asset, a site, a region, or the entire enterprise.

Additional examples of energy management and energy consumption systems and processes that can be used with the present systems and methods are disclosed in U.S. Pat. No. 7,062,389, entitled "Enterprise Energy Management System," which is hereby incorporated herein by reference in its entirety.

In one embodiment as described above, energy consumption information is manually collected and recorded on a periodic basis. Alternatively, energy consumption information is collected real-time or near-real-time using energy sensors or probes. These energy sensors, for example, may be TCP/IP network devices that only need to be connected to the sites communications network. This network could be a wired or wireless network. These network devices then take reading and post real-time energy consumption data to the network for use within the system for any type of tracking, management, or optimization as discussed herein. In one embodiment, such sensors communicate with the system through the asset interfaces 66 depicted in FIG. 2. Various alternative examples and methods of energy consumption data collection and tracking that can be utilized with the systems and methods herein are disclosed in U.S. Pat. No. 7,062,389, incorporated above.

Figure 6:
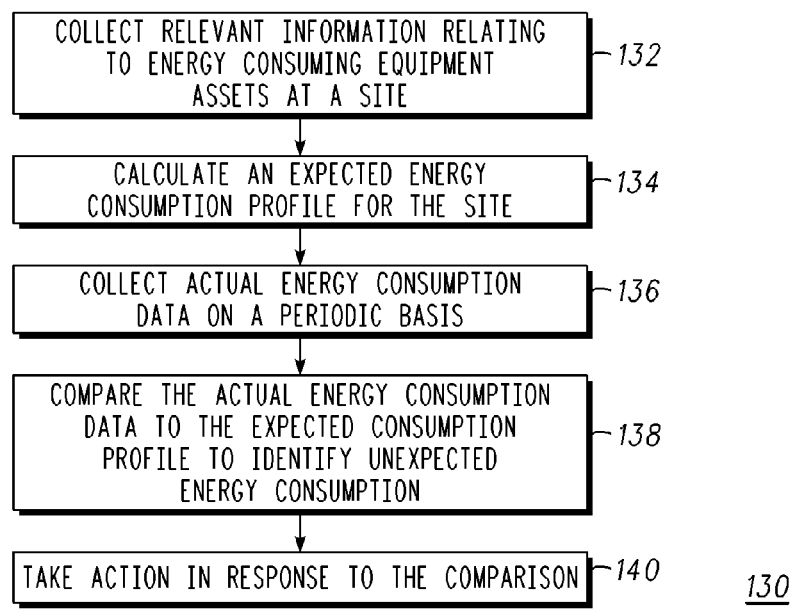
FIG. 6 is a flow chart a method for tracking and managing energy consumption at a site, according to one embodiment.

In another alternative embodiment, a system contemplated herein has software that can use the energy consumption data to track and manage unexpected energy consumption 130. That is, as shown in FIG. 6, in addition to collecting relevant information relating to the equipment (block 132) and collecting actual consumption data (block 136), the system calculates an expected energy consumption profile (block 134) based on the collected equipment information (block 132). System software then controls the comparison of the actual energy consumption data to the expected consumption profile (block 138). If the actual consumption data exceeds the expected consumption profile, the software directs the system to take some action to address the unexpected consumption (block 140), such as triggering an alarm, generating a report, or transmitting instructions to the equipment experiencing the unexpected consumption. Various embodiments of systems and methods of tracking and managing unexpected energy consumption are provided in U.S. Pat. No. 7,062,389, incorporated above.

Figure 7:
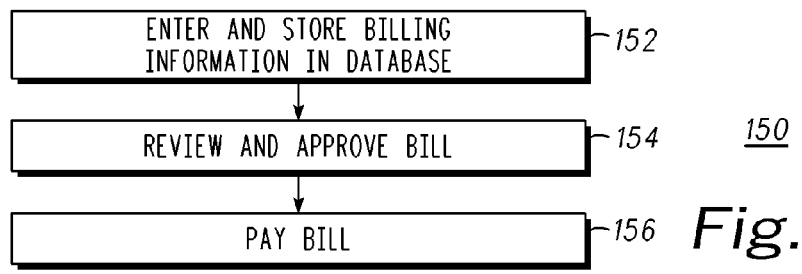
FIG. 7 is a flow chart showing a method of processing and paying utility bills, according to one embodiment.

In accordance with certain embodiments for tracking energy consumption, the systems and methods can provide for processing utility bills, wherein the bills can also provide asset information that can be used to calculate energy consumption. For example, FIG. 7 depicts one method of processing utility bills 150 in the following manner. Various system embodiments described herein allow for entry and storage in a utilities database (such as the database 62 depicted in FIG. 2) of billing information at each site for each utility provider (block 152). The system of this embodiment further provides for review and approval of each bill received from each utility provider at each site (block 154). In addition, the system provides for payment of each bill from each utility provider (block 156). Payment to the provider can be accomplished using an electronic payment system, according to one embodiment. One example of an electronic payment system that can be utilized in conjunction with the present invention is provided in U.S. application Ser. No. 10/922,364, entitled "Electronic Payment System," filed on Aug. 20, 2004, which is incorporated herein by reference in it entirety. Various embodiments of such systems and methods that can be used with the systems herein are disclosed in further detail in U.S. Pat. No. 7,062,389, which is incorporated above.

According to another aspect of the invention, the bill review and approval process (block 154) further includes identification of relevant money-saving packages or offers related to the bill under review. For example, the server (such as the server 52 depicted in FIG. 2) may access the utilities database (such as the database 62 in FIG. 2) to identify any money-saving packages or offers from the utility provider that sent the bill under review. The server may then compare the package or offer to the current bill to determine whether the bill qualifies for the discount, rebate, or other money-saving offer. Alternatively, the server identifies the relevant money-saving package or offer and transmits it to a user so that the user can determine whether the bill qualifies for the package or offer. If the bill qualifies, the package or offer is automatically applied to the bill total, thereby reducing the amount owed. Alternatively, a user applies the offer or package to the bill.

It is understood that examples of money-saving packages include the "demand-response" programs currently offered by various utility and/or power companies across the U.S. "Demand-response" and "demand-response event," as used herein, are intended to mean any program or implementation or occurrence by which a utility or power provider provides incentives for reduced energy consumption or imposes financially-based limitations on consumption during peak demand periods. In one exemplary embodiment in which the demand-response program is an incentive-based program, the utility or power provider provides discounts or some other type of money-saving incentive during a peak demand period for any customer/site/enterprise that reduces its energy consumption during the period by some predetermined amount. In an alternative exemplary embodiment in which the demand-response program is a required limitation program, the utility or power provider imposes fines or some other type of cost on the customer/site/enterprise during a peak demand period if the customer/site/enterprise does not reduce its energy consumption during the period by some predetermined amount.

In one demand-response example, the utility or power provider generates an alert or notice during a peak demand period relating to the incentive or consumption limitation. In one embodiment, the utility or power provider is coupled to an embodiment of a system as described herein over a network such that the utility or power provider can transmit an electronic alert or notice directly to the system. In this embodiment, the electronic alert or notice is received at the server and processed by software configured to receive and process such alerts or notices. Alternatively, the alert or notice is transmitted to a system user. For example, the alert or notice can be sent via e-mail, telephone, text message, or any other form of communication. In this embodiment, the user then enters the demand-response information into the system via a client computer or kiosk, and the software receives and processes the information. Regardless whether the alert or notice is received by the system or by a user, the system according to one embodiment has software that is configured to process the information to identify any assets or sites that qualify for the incentive or limitation. The same software, or a different software package, is further configured to provide notification to an appropriate person regarding the assets or sites that qualify for the incentive or limitation so that the person can determine whether to reduce consumption and how, or alternatively, is configured to provide notification that includes recommended forms of implementation (such as recommended methods of consumption reduction) that satisfy the parameters of the incentive/reduction. Alternatively, software can be provided that is configured to provide instructions to each asset or site via an asset interface (such as the interface 66 as discussed above) to reduce consumption by an appropriate amount. For example, consumption may be reduced by reducing the output of the various predetermined assets for a particular period (such as lowering the output of the lights and/or the HVAC at a location for 3 hours) or by simply turning the predetermined assets off for a particular period (such as turning off the lights and/or HVAC system for 10 minutes every hour). In a further embodiment, the system software can also provide for setting forth levels of implementation depending on the demand-response event. For example, a first level could be shutting off the lights and HVAC off for some period every 60 minutes, while a second level could be shutting off the lights and HVAC for some period every 30 minutes.

In accordance with a further embodiment, the system can also provide for settlement, wherein "settlement" is defined as the comparison and reconciliation of the agreed-upon consumption reduction with the actual reduction. That is, if the demand-response event requires that the customer/site volunteer or commit to the consumption reduction and further requires verification that the agreed-upon consumption reduction was met by the customer/site, certain embodiments of the present systems can include software that compares the agreed-upon consumption reduction with the actual consumption reduction and transmits this information to a user, the utility or power provider, or both.

Real-time pricing could also be utilized by various embodiments of the present systems and methods. That is, utilities and energy providers may in the future change the price of their product (utility or energy) on an hour-to-hour or even minute-to-minute basis. Various embodiments of the systems described herein have capabilities to capture and utilize such real-time pricing to track and manage energy consumption and prices on real-time basis.

For example, according to one embodiment the system is provided with real-time information relating to the utility or energy pricing and can utilize that information as described herein to manage energy consumption. In this embodiment, as is described above, the system server (such as the server 52 depicted in FIG. 2) has access—via a network or some other communication link—to external data sources or other systems such as the data sources or systems of the utility and energy providers. Alternatively, the utility and/or energy provider(s) can have a client computer (such as a client computer 54 as depicted in FIG. 2) at its central location. Thus, the real-time pricing information (including hour-to-hour or minute-to-minute changes) is communicated to any system embodiment contemplated herein via communication with the external data source or system or via a client computer and the energy consumption software provided at the system can track these prices, calculate the impact of the pricing changes for each affected asset, each affected site, and/or for the entire enterprise and implement an appropriate action as described herein to the price change.

In one embodiment of the present invention, the system 100 further tracks and manages refrigerant loss of any asset that contains refrigerant, as described in further detail below and further as disclosed in co-pending U.S. patent application Ser. No. 10/429,619, filed on May 5, 2003, which is incorporated herein by reference in its entirety.

Figure 8:
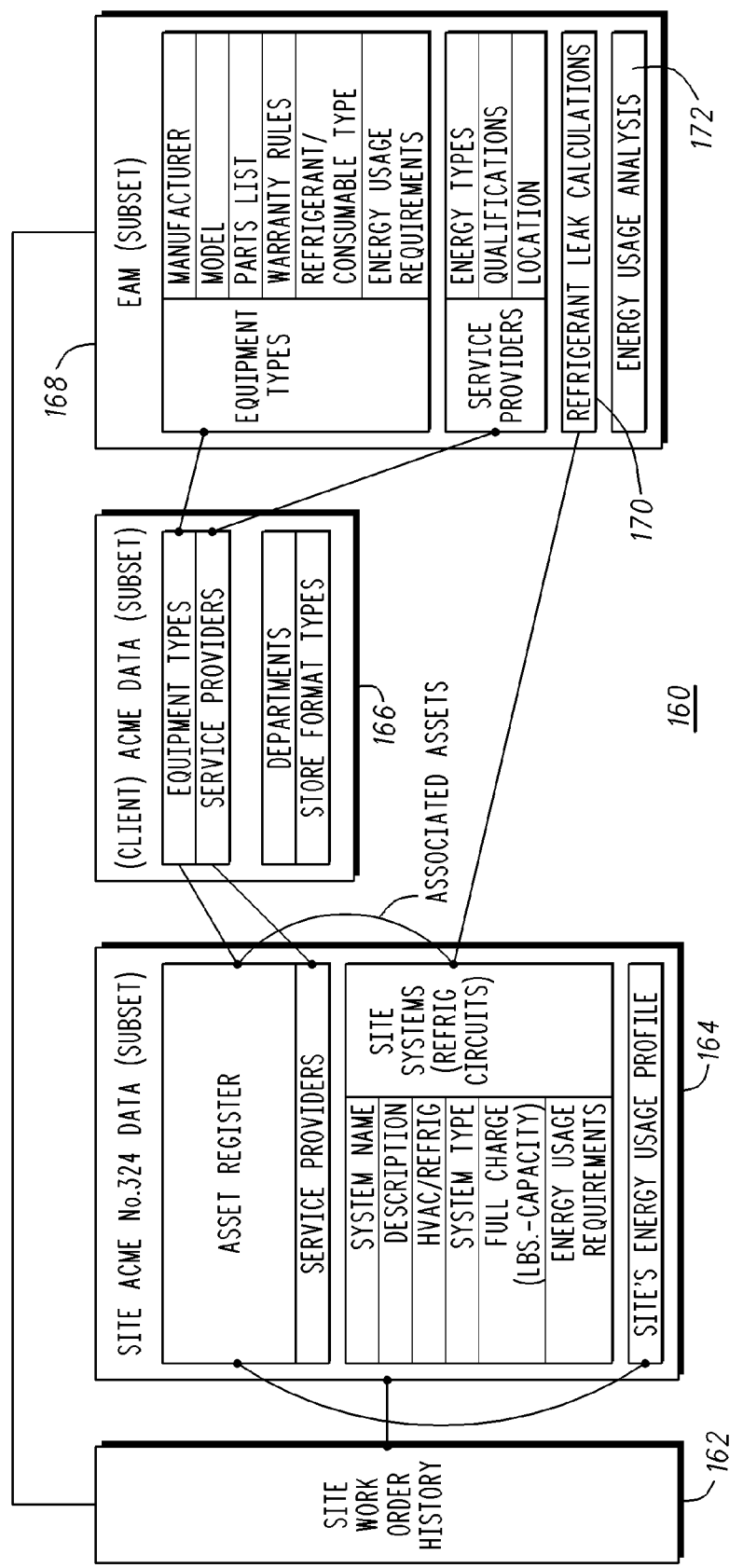
FIG. 8 is a diagram showing a structure for storing energy consumption data, according to one embodiment.

In addition, various embodiments of the systems described herein can also correlate energy consumption data with refrigerant loss data to explain trends in energy consumption. For example, FIG. 8 is a diagram showing a database structure 160 for information relating to various categories of energy consuming and refrigerant using equipment. The database structure 160 is useful in correlating energy consumption data with refrigerant loss data to explain trends in energy consumption. As shown in FIG. 8, the database structure 160 includes work order data 162, site specific data 164, client or enterprise specific data 166, and general data 168. The structure 160 shown allows various equipment categories and attributes to be configured by the particular enterprise. The work order data 162 includes information relating to repairs of site refrigeration circuits, which are used to calculate refrigeration leaks 170.

The structure 160 allows a user to correlate changes in energy consumption 172 with refrigeration leaks. This allows a user or the system to explain the reason for unexpected energy consumption or spikes during a particular time period. This could be accomplished, for example, by comparing energy consumption over a specified period of time with refrigerant loss and repair data for the same period of time. If a piece of equipment was operating with a low level of refrigerant, it may explain the spike in energy consumption for that period of time.

Using the information relating to the energy consuming equipment at a site and the actual energy consumption data collected, a user of the method or the system can compare consumption information to utility bills to identify potential billing errors. Likewise, a user can analyze consumption information and identify potential equipment malfunctions in need of repair.

In another embodiment, the various system embodiments described herein provide for a method of calculating a total cost of ownership of an asset. That is, the system has software to calculate a total cost of ownership of a piece of equipment, a site, a region, or an entire enterprise. In one implementation, the software calculates a total financial cost of ownership of a piece of equipment, site, region, or enterprise using at least the purchase cost of the equipment, the repair costs associated with the equipment, and the energy consumption cost of the equipment. Alternatively, the software can calculate a total financial cost of ownership of an asset, site, region, or enterprise based on any additional parameters that contribute to the total financial cost, including, for example, any carbon valuation such as any carbon credits that are accumulated (or carbon tax avoided) by the asset, site, region, or enterprise.

Various systems and methods described herein relating to tracking and management of energy consumption further provide for data analysis, including data correlation and predictive analysis. That is, according to one embodiment, these systems include software that can utilize the information stored, assimilated, or used by the system to identify correlations with other information and utilize those correlations to predict trends. Subsequently, the software can take appropriate actions in the form of instructions to the various assets based on a predicted trend, or the enterprise or a user can take appropriate actions based on the predicted trend.

The information that can be used for the correlation analysis includes the energy management information, the refrigeration loss information, the utility bill information, the service information (which, as described above, includes maintenance information, the total cost information, present and historical weather and temperature data for a relevant region, market demand for a utility service, and the current rate (cost per unit) for a utility service. In one aspect of the invention, the present and historical weather and temperature data, the market demand for a utility service, the current rate for a utility service, and any other similar or related data can be included in a database or separate databases in the system or it can be accessed by the system from another source such as an external database accessed over the network, a diskette, a compact disk, or any other data source. According to one embodiment, utility billing information is correlated with service information, refrigerant usage, energy usage, total cost information, weather/temperature information, utility service market demand, and a current utility service rate or rates. That is, certain events, details, or trends in the billing information are correlated with any other information. Alternatively, any of the above information can be correlated with any other of the above information. According to one embodiment, this allows a user or the system to relate changes in one set of parameters such as billing information to other parameters as described above. Thus, relationships between various types of information can be identified.

In accordance with another embodiment, the system also provides for predictive analysis and planning based on the correlated data described above. That is, the system includes software that draws upon the data correlations identified above to predict future trends in the data. The enterprise or a user can then utilize a predicted trend and the above information to take appropriate steps to address any predicted impact of the trend. According to one exemplary embodiment, predicted weather patterns can be used to predict a trend in energy use and utility bill amounts. For example, perhaps a particularly cold winter has been predicted. The system can compare the predicted winter season with past correlations and/or calculated correlations between utility bills and similar winter seasons. Based on the correlations, the system can predict the impact of the cold winter season on the size of the utility bills for a site or a group of sites in the region impacted by the cold weather.

In another exemplary embodiment in which each site has been mapped with GIS capabilities as disclosed in U.S. application Ser. No. 10/771,090, which is incorporated herein by reference in its entirety, the system can compare a predicted storm path with site locations using a map-based interface and identify the sites of the enterprise predicted to be directly affected by possible utility outages. The system can further notify a user or users of the predicted possible outages.

In another exemplary embodiment, a predicted temperature spike across a certain region can be used to predict expected energy requirements relating to electricity, etc. (and the resulting expected utility bills).

In any of the above three examples, additional factors could be considered relating to the predicted weather or temperature event, such as, for example, the current market demand and utility rates in each example. Thus, in this example, demand and rate trends could also be taken into account in formulating predictions regarding expected market demand and expected rates during weather- or seasonally-related events or periods.

Preventative action can then be taken by the user or the enterprise based on the predicted information provided by the system. In one embodiment, the user takes action based on the predicted information provided by the system 100. In the example of the predicted winter season, the user can take such steps as installing or providing additional heaters at the appropriate locations, reducing energy consumption at unaffected sites in anticipation of increased consumption at the affected sites, or any other appropriate action to prepare for the expected increase in utility consumption. In the example of the predicted storm path, the user could strategically position power generators or other services at the most vulnerable sites prior to the weather pattern. In the example of the predicted temperature spike, the user could place power generators at each site that is expected to be affected by the temperature spike to reduce the load on the electrical power grid in the area and reduce the utility bill for those sites.

Alternatively, the preventative action is implemented by the system, according to one embodiment. That is, various embodiments of the system allow for data and predictive analysis, including predicting certain trends relating to certain assets or equipment, and upon the triggering of a certain event associated with those predictions, electronically communicating or transmitting operating instructions to the relevant piece of equipment via an asset/equipment interface associated with that piece of equipment such as the interface 66 depicted in FIG. 2. Thus, the asset/equipment interface capabilities can be used in conjunction with the data and predictive analysis capabilities as described above to provide for preventative action or action to address the impact of a predicted trend.

In one embodiment, the asset/equipment interface capabilities can be utilized according to various system embodiments described herein to remotely control operating parameters of certain energy or energy-related systems at a site, as disclosed in further detail in U.S. application Ser. No. 10/734,725, which is incorporated herein by reference in its entirety, to accomplish measures intended to prevent or reduce any negative impact of predicted phenomenon as described above. Thus, various systems allow for tracking various parameters relating to equipment at a site or multiple sites, performing data and predictive analysis, and upon the triggering of a certain event or predicted event associated with those parameters, electronically communicating or transmitting operating instructions to the equipment. According to one embodiment, the types of equipment that can be remotely controlled in this fashion include, but are not limited to, refrigeration, lighting, and HVAC equipment and systems.

In the example of the predicted cold winter season, the predicted cold temperatures can trigger the system to electronically communicate instructions to the HVAC systems and, in some embodiments, additional power consuming systems of unaffected sites to reduce power output of those systems, thereby reducing the heating bills at those sites and saving the enterprise money to compensate for the increased costs at the affected sites. In the example of the predicted temperature spike, the predicted high temperatures could trigger the system to electronically communicate instructions to the HVAC systems of unaffected sites to reduce power output of those systems, thereby reducing the air conditioning bills at those sites and saving the enterprise money to compensate for the increased costs at the affected sites.

In either of the above examples, the instructions transmitted by the system can be further impacted by the system's consideration and analysis of the market demand information and utility rate information in addition to the predicted weather trends. According to one embodiment, the predicted weather pattern results in a predicted demand and/or utility rate that triggers instructions transmitted by the system to the relevant equipment through an appropriate interface or interfaces—such as an interface 66 as depicted in FIG. 2—based on the predicted rate. Alternatively, a utility provider can provide real-time or nearly real-time demand and rate information that can be inputted into the system and based on the demand or rate, the system can be triggered to transmit various instructions from the system to the relevant equipment through the appropriate interface or interfaces. For example, in the cold temperature example above, the server software may predict a certain utility rate that triggers an electronic instruction to be transmitted to the equipment at the affected site or sites instructing the HVAC systems to reduce output by some predetermined percentage during the predicted peak rate period(s) to reduce expenses. Thus, the market demand and utility rate information can be taken into account in providing instructions to the relevant equipment and/or sites. In a further alternative, the system can be triggered by any number of different parameters to communicate with various equipment to implement preventative or remedial actions in response to a predicted trend.

Tracking or Managing Asset Service/Maintenance

Figure 9:
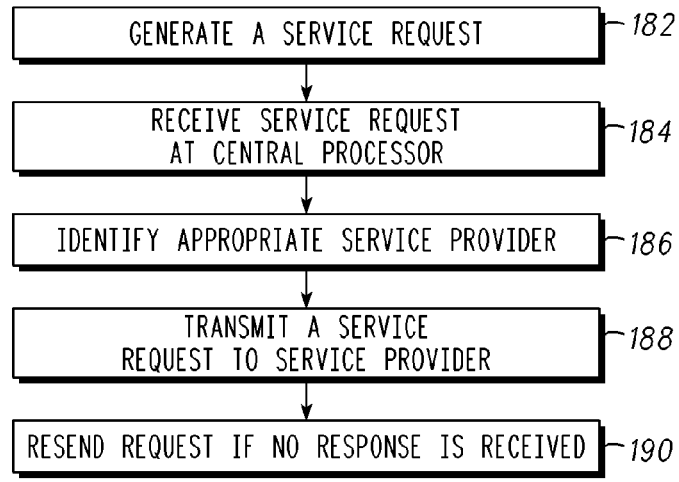
FIG. 9 is a flow chart showing a method of identifying a service provider and transmitting a service request, according to one embodiment.

It is understood that various embodiments of the systems and methods disclose herein also provide for tracking and managing any asset service or maintenance needs. One exemplary embodiment of the system provides for a method of servicing and maintenance of assets by service providers, including third party providers or in-house personnel 160. As shown in FIG. 9, the method 180 generally comprises generating a service request (either at a client computer, a kiosk, an asset interface, or some other connection to the system) (block 182), receiving the service request at the central processor (block 184), utilizing software to automatically identify an appropriate service provider in the service provider database (block 186), and automatically transmitting a service request to the service provider, along with any additional asset information which may be needed by the service provider (block 188). In one embodiment, if no response is received within a predetermined period of time, the request is resent (block 190). It is understood that any method of tracking and managing asset service and/or maintenance can be utilized in the systems described herein, including those methods of asset service and/or maintenance described in U.S. application Ser. No. 09/883,779, entitled "Enterprise Asset Management System and Method," which is hereby incorporated herein by reference in its entirety.

Tracking or Managing Emissions

Figure 10:
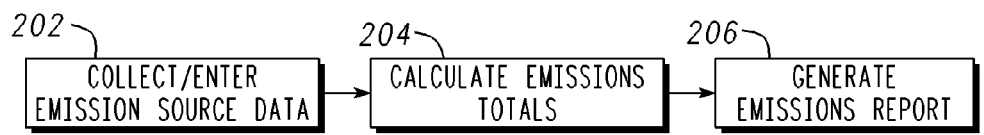
FIG. 10 is a flow chart illustrating a method of generating an emissions report, according to one embodiment.

In further additional embodiments, the systems disclosed can track GHG emissions of an asset, a site, a region, or an enterprise. FIG. 10 is a flow chart depicting the overall operation of a method and system for tracking emissions 200, according to one embodiment. The system generally comprises collecting data and/or entering data into the system relating to assets that are emissions sources (block 202), calculating emissions totals (block 204), and, according to certain alternative embodiments, generating emissions reports requested by a user on the basis of the stored emissions data (block 206). The system 200 can track the emissions of each emissions source of interest. In one embodiment, the system 200 tracks the emissions of each source at a particular location. Alternatively, the system 200 tracks the emissions of each emission source of each location of an enterprise. The system 200, in accordance with another aspect, can generate reports detailing the amount of emissions produced by an emission source or group of emission sources, particularly the amount of greenhouse gases produced by each source, and more particularly the amount of carbon dioxide and carbon dioxide equivalents produced.

In one embodiment, any such system tracks all types of emissions from all kinds of emission sources. For example, in one embodiment, emissions can include emissions that originate from both direct and indirect emission sources. Thus, in one embodiment, the system tracks emissions from both direct and indirect sources. Alternatively, the system can track solely the emissions from direct emission sources or solely the emissions from indirect emission sources.

Direct emission sources are those sources of emissions which are owned or controlled by the enterprise. Generally, direct emission sources comprise four subtypes: mobile combustion sources, stationary combustion sources, manufacturing process sources, and fugitive emission sources. For example, a vehicle or building heater would be a direct emission source.

In contrast, indirect emission sources include those sources which produce emissions, in whole or in part, as a result of the enterprise's activities, and are owned or controlled by another entity. Indirect emission sources include, for example, any energy or other GHG emitting sources that are imported from a third party, such as imported electricity, imported steam, imported heating, or imported cooling, all of which can also be referred to herein as "utilities." Imported electricity can include, but is not limited to, any electricity imported from one or more electric companies or other electricity providers. In one embodiment, imported electricity can include electricity from a co-generation plant, which is an engine or plant that simultaneously generates power and useful heat. Imported steam can include, but is not limited to, any steam imported from one or more steam providers or power plants. Imported heating can include, but is not limited to, any heat imported in any form from any heat provider. According to one implementation, imported heating can include steam or hot water imported from one or more heating providers. Imported cooling can include, but is not limited to, any cooling imported in any form from any cooling provider. In accordance with one aspect, imported cooling can include imported chilled water or other media for air conditioning or other uses from one or more cooling providers.

Returning to direct emission sources, the mobile combustion sources are those non-stationary assets of an enterprise that create emissions by means of fuel combustion, including, for example, automobiles, motorcycles, trucks, forklifts, boats, airplanes, construction equipment, diesel generators, such as backup diesel generators, and the like. The stationary combustion sources are those stationary assets of an enterprise that create emissions by means of fuel consumption, including, for example, power plants, refineries, furnaces, heaters, and the like.

The manufacturing process sources include an enterprise's manufacturing or industrial processes that result in release of emissions. These sources may include, for example, the manufacturing of aluminum, iron, steel, refrigerants, ammonia, acids, and lime. The fugitive emissions sources include the assets of an enterprise that cause emissions to be released by means of unintentional release or leak, such as is common in air conditioning and refrigeration equipment, for example.

While specific examples of emission sources for each emission type and subtype have been provided, the methods and systems discussed herein anticipate the tracking of any type of emission from any emission source.

It is understood that the information collected for an emission source may vary depending on the type or category of emission source. For example, the emission sources may be placed into two categories: direct emissions and indirect emissions (as described above). Alternatively, the direct emissions sources may be further placed into four subcategories based on the four subtypes described above. Depending on the category and/or subcategory of a source, the type of information collected, and thus the fields for which information may be collected, may differ. For example, the emission source information may include any emission source identifying information such as the emission source identifier and type and/or subtype of the emission source. In addition, the emission source information may include any historical emissions data for the source (also referred to herein as "legacy" data). Additionally, the information may include site information relating to all of the sites where the enterprise has emission sources, including site location, identification of emission sources at the site, and any other relevant site information. If the emission source is one part of a system or group comprised of more than one emission source, in some embodiments, the emission source information may include group information, including the group name, description of the group, identification of the emission sources in the group, along with any other relevant information. A group may comprise, for example, all of the emission sources at a particular site location. Additionally, for example, a group may comprise all of the emission sources of an enterprise.

One general method of collecting indirect or direct emissions, according to one embodiment, includes collecting usage information. In the case of indirect emissions sources such as utilities, the utility provider provides to the enterprise an invoice relating to the utility usage by the enterprise or by one particular location of the enterprise. Thus, the collection of usage information relating to such an indirect emissions source includes collecting the invoice information. According to one embodiment, the invoice information is collected by simply receiving a hardcopy of the invoice, for example by receiving the hardcopy in the U.S. mail. Alternatively, the invoice information is collected in an electronic format via an e-mail or other electronic form of communication, including at a website. In one example, the information of interest includes the total utility usage.

Alternatively, the usage information can be collected via an interface similar to the interface 66 described above with respect to FIG. 2. In this embodiment, the interface is coupled to an energy meter (such as, for example, an electric meter or a gas meter) to collect all usage information based on the meter. One example of such an interface is the Data Manager™ available from Resource Data Management in Glasgow, Scotland.

For direct emissions sources, according to one embodiment, the emissions source information can include total usage of the source during a given period. Thus, the collection of information for direct emissions sources can also include the collection of usage information. For example, the direct emissions source can be a mobile combustion unit such as a vehicle, and the source information of interest can include the total fuel usage during the period. In one aspect, the usage information is collected by manually collecting all fuel invoices associated with the source. Alternatively, the fuel invoice information is collected in an electronic format via an e-mail or other electronic form of communication, including at a website.

In one aspect of the systems and methods disclosed herein, any invoices or billing information can be managed and entered or processed via a method or system similar to, or in cooperation with, any of the methods or systems of energy management described above and/or any of the methods or systems disclosed in co-pending U.S. application Ser. No. 11/423,860, filed on Jun. 13, 2006, which is hereby incorporated herein by reference in its entirety.

One example of a method for processing bills or invoices is set forth in FIG. 7, discussed above. In a further embodiment, the billing information for entry and storage can include, but is not limited to, all the information provided in each periodic bill or invoice associated with any emissions source, such as a fuel bill relating to a direct emissions source or a bill from a utility provider. For example, the billing information can include all fuel bills or other invoice information for any enterprise site relating to the operation of one or more direct emissions sources and/or all invoice information for any enterprise site provided separately by one or more of the gas provider, electricity provider, or any other utility or energy provider that results in the emission of GHGs. In one embodiment, the billing or invoice information is entered manually by a user, such as an employee of the enterprise or an employee of the utility provider, at a client computer or kiosk or other entry point.

Alternatively, the information is entered electronically. For example, electronic entry can be accomplished by scanning a document with any known scanner utilizing OCR or any other scanning technology and loading the scanned information into the system. In another example, the information is entered electronically by direct electronic communication between the billing system of the provider of the invoice and a system as described herein over the network similar to the network described in FIG. 2. In a further alternative, the billing information is electronically compiled by an external individual or individuals, such as, for example, a third-party entity hired to compile the billing information into a format that can be easily loaded into the system and then the billing information is loaded into the system. According to one embodiment, the third-party individual or individuals compile historical billing information into an appropriate format for loading into the system. Alternatively, the third-party individual or individuals compile current billing information on an on-going basis for loading into the system. In a further alternative, both historical and current billing information are compiled into an appropriate format by the third party individual or individuals or by an employee or agent of the enterprise.

It is understood that the billing information collection described in the paragraphs above can also be utilized for collection of bills for purposes of energy consumption tracking and management.

For purposes of both direct and indirect emissions tracking, in addition to usage information and any other information relating to the amount of emissions a source has produced, the user may enter any other relevant information, including but not limited to, the site where the emission source is located, the group that the emission source is a part of, if any, and the date the information was gathered.

In one embodiment, the indirect emissions source is electricity. In another embodiment, the indirect emissions source can be imported steam, imported heating, imported cooling, or any other imported energy source that results in the emission of any GHGs. In one embodiment, the information gathered includes the total energy consumption of the source. For example, if the indirect emissions source is electricity, the information to be collected can include the total electricity consumption for some period in kilowatt hours. As discussed above, this information can be collected or calculated from the electricity invoice. In another example, the indirect emissions source is imported steam, heating, or cooling. In this example, the information to be collected can include, but is not limited to, the total steam, heating, or cooling consumption for some period in any appropriate unit of measure.

In one embodiment, the direct emissions source is a mobile combustion source. In another embodiment, the direct emissions source can be a stationary combustion source, a power plant, a manufacturing plant, or any other type of plant, asset, or equipment used at an enterprise location that emits any kind of GHGs at the location. In one embodiment, the information gathered includes the total energy consumption of the source. For example, if the direct emissions source is a mobile combustion source, the information to be collected can include any or all of the make and model of the source, the type of fuel consumed by the source, the total fuel consumption of the source, and the distance traveled by the source. As discussed above, this information can be collected or calculated from any or all of the fuel invoice(s), fuel purchase records, odometer readings, trip manifests, and/or maintenance records. In another example, the direct emissions source is a co-generation plant as described above and the emissions source information that is collected can include the fuel input, electricity production, net heat production, and/or plant efficiency. In a further example, the direct emissions source is a stationary combustion source, and the source information that is collected may include the type of fuel consumed by the source and the total fuel consumption of the source. This information can also be obtained from utility bills, according to one embodiment.

In another embodiment, the direct emissions source is a manufacturing process emission source, and the source information that can be collected includes total emissions of any measurable gas of interest in any appropriate unit of measure, including, for example, those gases and units of measure set forth in EPA rules and government legislation.

According to one embodiment, the timing of the emissions information collection and the number of such collections can vary significantly. That is, the collection can be performed daily, weekly, monthly, yearly, or at any other known interval. Alternatively, the collection can be performed randomly. It is also understood that the number of data points collected can vary significantly. That is, the emissions information can be based in one embodiment on only one invoice for a broad emissions source category. Alternatively, the information can be based on one invoice for a subcategory of emissions sources. In a further alternative, each emissions source is monitored individually by a user or dedicated interface or sensor.

In another embodiment, fugitive emissions can also be tracked. The fugitive emissions source can be any of a number of assets or equipment that leaks any GHG. In one example, the fugitive emissions source is refrigeration equipment, and the source information that can be collected includes the equipment type, the actual and/or calculated leak rate, and/or the quantity and type of refrigerant used.

According to one embodiment, the tracking and management of fugitive emissions can be performed via a method and system similar to that described in co-pending U.S. application Ser. No. 10/429,619, filed on May 5, 2003, which is hereby incorporated herein by reference in its entirety. The application discloses tracking and management of fugitive emissions such as refrigerant leakage, and it is understood that the teachings can apply to any type of fugitive emissions.

For either or both of direct and indirect emissions tracking, the emissions source information is then entered into the system. In one implementation, the information is manually entered by a user. For example, a user could enter the information from a hardcopy invoice into the system using a client computer. Alternatively, the information is automatically entered into the system. For example, the information is provided in electronic format and is automatically loaded into the system upon receipt or retrieval from the provider of the invoice.

In an alternative embodiment, any emission source information can be entered into the system via an equipment interface similar to the interface discussed above with respect to FIG. 2. The equipment interface allows the system to automatically track information related to the amount of emissions produced by a certain emission source without any manual input or effort by a user. For example, a stationary combustion source, such as a smokestack, may be equipped with an equipment interface that continuously measures the amount of emissions produced by the source and is equipped with a communication link between the source and the central processor. Any information received by the central processor from the equipment interface may then be stored in the database.

In a particular embodiment, the system saves into an asset database (or an emissions database), such as a database similar to the one discussed above with respect to FIG. 2, all of the information gathered such that the system accumulates all of the information relating to the amount of emissions produced by each asset.

Returning to FIG. 10, certain embodiments of the method of tracking emissions include calculating the amount of emissions produced by an emission source or sources (block 204). That is, the amount of emissions produced, particularly the amount of greenhouse gas emissions, and more particularly the amount of $CO_2$ and $CO_2$ equivalents, produced by a particular source or group of sources can be calculated for any desired time period. In certain embodiments, the system calculates the emissions produced by an entire site and/or the entire enterprise. In other embodiments, the system automatically performs calculations and or reports emission totals at recurring predetermined intervals, such as every month or every year.

In one aspect, the amount of emissions is calculated in the system by inputting into an appropriate equation emissions information stored in the database and emission factors appropriate to the source for which an emission production amount is to be calculated. For purposes of the present application, "emission factors" are representative values that relate the quantity of emissions released to the atmosphere with an activity associated with the release of emissions. These factors are expressed as the weight of emission (typically Metric Ton of $CO_2$ divided by a unit weight, volume, distance, or duration of the activity producing the emission). Emission factors are made available through various governmental agencies, such as, for example, the Intergovernmental Panel on Climate Change ("IPCC") or Environmental Protection Agency. Because the emission factors fluctuate, in some embodiments, they are updated on a periodic basis.

One example of an emissions factor is the factor associated with indirect emission sources, such as those sources provided by utilities. One common term for such a factor is the "eGRID factor." This factor is assigned to an energy provider or utility based on the emissions created by the provider, which is influenced by the sources of the energy. For example, an electricity provider that utilizes solely coal plants to generate electricity would generate significantly more emissions than a provider that utilizes solely windmills to generate electricity, and thus the factor assigned to each would reflect that difference in emissions. Thus, an emissions factor would be included in any calculation relating to an indirect emissions source.

In a further example of an emissions factor, if the emission source is a co-generation plant or system utilized by a third party energy or utility provider (and thus is an indirect emissions source), one emission factor of note relates to the calculation of emissions of the enterprise relating to energy acquired from a third party provider using such a co-generation plant or system. That is, a co-generation plant or system's simultaneous generation of power and useful heat creates a need for a factor or formula that accounts for such simultaneous generation and provides a relatively accurate estimate of the emissions associated with energy utilized by the enterprise. According to one implementation, one such calculation is the coefficient of performance, which reflects the relationship of useful heat generated by a co-generation plant or system to the power consumed to generate that heat. The equation for this particular coefficient can be expressed as follows:

$$COP_{max} = \left(\frac{Q_{low}}{Q_{high} - Q_{low}}\right)_{max} = \frac{Q_{low}}{Q_{low}\frac{T_{high}}{T_{low}} - Q_{low}} = \frac{T_{low}}{T_{high} - T_{low}}$$

According to one embodiment, the amount of emissions produced is calculated in the system using the following general equation:

Emissions Produced=Emission Activity[weight, volume, distance, or duration]×Emission Factor [Metric Ton $CO_2$/(weight, volume, distance, or duration)]

That is, the processor, according to one embodiment, performs the calculation based on the above equation to determine the amount of emissions produced by a particular emissions source.

For example, if the emission source is purchased electricity, the amount of $CO_2$ produced is calculated by the system using the following equation:

Emissions Produced=Electricity consumed[kWh]× Emission Factor[Metric Ton $CO_2$/kWh].

As another example, if the emission source is an stationary combustion source that consumes natural gas, the amount of $CO_2$ produced is calculated by the system using the following equation:

Emissions Produced=Natural gas consumed[Therms]× Emission Factor[Metric Ton $CO_2$/Therm].

Further emissions totals can be calculated by the system using any of the equations and factors provided in the GHG protocol by the World Resources Institute (www.ghgprotocol.org), which is hereby incorporated herein by reference in its entirety. Plus, further calculations, equations, and emissions factors relating to GHG emissions are set forth in the California Climate Action Registry General Reporting Protocol, Version 2.1, published in June, 2006, which is hereby incorporated herein by reference in its entirety. In addition, the emissions totals can be attained using any known equations or calculations for determining emissions, any or all of which can be integrated into the software of the system. For example, according to one embodiment, the calculations and equations are integrated into the software of a central processor similar to the central processor described with respect to FIG. 2.

In accordance with another embodiment, a method and system for tracking and/or reporting emissions can include tracking the emission of $CH_4$ and/or $N_2O$ from an emission source. In a further embodiment, the method or system can include converting the $CH_4$ and/or $N_2O$ emissions into "$CO_2$ equivalents." According to one embodiment, the conversion is accomplished on the basis of the respective global warming potentials ("GWPs") of the $CH_4$ and/or $N_2O$ emissions. "GWPs," as used herein, are representative values used to compare the abilities of different greenhouse gases to trap heat in the atmosphere. The GWP values provide a construct for converting emissions of various gases into a common measure denominated in $CO_2$ equivalent ("$CO_2e$") and is provided by the IPCC. It is understood that every greenhouse gas and every regulated substance as defined herein has a GWP value that can be used (along with the amount of the GHG or substance) to calculate the $CO_2$ equivalents for the GHG or substance. According to one embodiment, the server of the system performs the conversion based on the above construct.

In one embodiment, the conversion equation is set forth as follows:

Metric Tons of $CO_2e$=Metric Tons of Non-$CO_2e$GHG×GWP.

The 1996 and 2001 GWP numbers are set forth in Table 1, which was published in the California Climate Action Registry General Reporting Protocol, discussed and incorporated above.

TABLE 1

| Greenhouse Gas | GWP (SAR, 1996) | GWP (TAR, 2001) |
|---|---|---|
| $CO_2$ | 1 | 1 |
| $CH_4$ | 21 | 23 |
| $N_2O$ | 310 | 296 |
| HFC-123 | 11,700 | 12,000 |
| HFC-125 | 2,800 | 3,400 |
| HFC-134a | 1,300 | 1,300 |
| HFC-143a | 3,800 | 4,300 |
| HFC-152a | 140 | 120 |
| HFC-227ea | 2,900 | 3,500 |
| HFC-236fa | 6,300 | 9,400 |
| HFC-43-10mee | 1,300 | 1,500 |
| CF4 | 6,500 | 5,700 |
| C2F6 | 9,200 | 11,900 |
| C3F8 | 7,000 | 8,600 |
| C4F10 | 7,000 | 8,600 |
| C5F12 | 7,500 | 8,900 |
| C6F14 | 7,400 | 9,000 |
| SF6 | 23,900 | 22,000 |

Source: U.S. Environmental Projection Agency, U.S. Greenhouse Gas Emissions and Sinks: 1998-2000 (April 2002).

It is understood that the GWP values are merely one estimate to capture the ability of each GHG to trap heat and are occasionally modified by the IPCC. In alternative embodiments, other measures and other calculations could be used to calculate $CO_2$ equivalents or other types of equivalents. In a further embodiment, emissions can be measured and tracked without calculating any equivalents.

In accordance with a further implementation, certain systems and methods described herein can provide for tracking and managing carbon valuation. For purposes of this application, "carbon valuation" is intended to mean any form of value assigned to GHG emissions or a reduction thereof, such as carbon credits or a carbon tax or any other such valuation. It is understood that "carbon credits" is intended to mean any tradable commodity that assigns a value to GHG emissions or a reduction thereof. It is understood that there are currently two exchanges for carbon credits: the Chicago Climate Exchange and the European Climate Exchange. It is further understood that certain quotas have been established by the Kyoto Protocol and countries around the world relating to the amount of GHG emissions that countries and businesses can produce, and that each business can compare its emissions to its quota to determine whether it has a credit surplus (because its emissions were below its quota) or it has a credit debt (because its emissions exceeded its quota), and act accordingly. While the various embodiments of systems and methods relating to the tracking and/or management of carbon valuation described herein are discussed mainly in the context of tracking and managing carbon credits, it is understood that these embodiments are intended to track or manage any type of carbon valuation.

Figure 11:
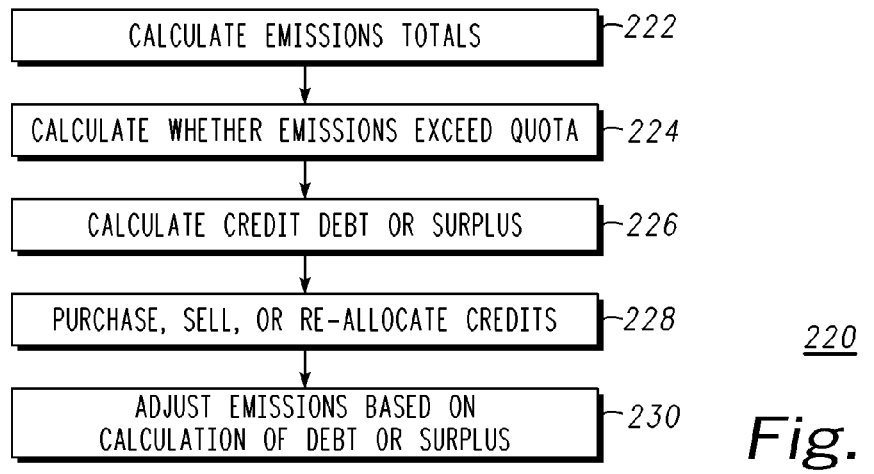
FIG. 11 is a flow chart illustrating a method of tracking and managing carbon credits, according to one embodiment.

According to one embodiment, one method and system of tracking and managing any carbon valuation such as carbon credits for an enterprise 220 is set forth in FIG. 11. It is understood that this method and system can be performed on the basis of a site or an entire enterprise. Alternatively, the method and system can be performed on the basis of a grouping of sites, such as all the sites in a particular state or region. It is also understood that the methods and systems described herein are not limited to tracking and/or management of carbon valuation such as carbon credits or the climate exchanges described above and can be used to track and manage any type of credit or other carbon valuation (such as a carbon tax) relating to GHG emissions.

First, as set forth in FIG. 11, the system provides for calculating the emissions totals (block 222) in a fashion similar to the emissions calculations provided with respect to block 204 in FIG. 10 and discussed above. Then, the system provides for comparing the emissions totals to the predetermined quota for the site or enterprise (or other measure, as discussed above) and calculating whether the emissions for that site or enterprise exceed the quota (block 224). Based on this calculation, the system or method provides for calculating the carbon valuation debt or surplus, which in this example specifically relates to calculating the carbon credit debt or surplus (block 226). That is, if the site or enterprise has exceeded its emissions quota, then it has a carbon credit debt. In contrast, if the site or enterprise has emitted less than its quota, then it has a carbon credit surplus. Similarly, any carbon valuation can be calculated in this manner.

According to one embodiment, if the carbon valuation is a tradable commodity such as carbon credits, the system 220 then allows for the purchase, sale, or reallocation of such credits (block 228) depending on whether there is a surplus or debt. That is, if there is a credit debt, the system calculates the number of credits that must be purchased to eliminate the debt. In one implementation, the system is connected via a network connection or other communication link to an external source that provides the current market price for a credit and utilizes that information to calculate the cost of purchasing the required credits. In another embodiment, the system provides for or automatically performs a purchase of the required credits.

If there is a credit surplus, the system 220 calculates the credit surplus (the number of credits that the site or enterprise has to spare because it did not exceed its emissions quota). In another embodiment, the system 220 also utilizes the communication link to calculate the value of the surplus credits. In another embodiment, the system provides for or automatically performs a sale of the surplus credits.

Alternatively, in an embodiment in which the system 220 calculates a credit surplus at one or more sites of an enterprise and further calculates a credit debt at one or more other sites of the enterprise, the system can provide for calculating each of the surpluses and the debts and reallocating the credits from the surplus sites to the debt sites, thereby eliminating at least a portion of the need to purchase additional credits on the market. Such calculations can also be used with any type of carbon valuation.

In a further alternative step, the system 220 also can provide for the adjustment of current or future emissions based on the calculations of a carbon valuation debt or surplus (block 230). Such adjustment can be implemented with the predictive capabilities discussed below.

In one aspect, a processor in the system 220 has software configured to perform the above comparisons and calculations.

In a further implementation, various systems described herein allow for tracking and verifying any positive carbon valuation units such as credits awarded or otherwise earned for reducing of emissions over a predetermined period of time. Certain GHG emission reduction programs currently available to entities with GHG emitting assets and/or locations allow for accumulation of carbon credits for reducing GHG emissions by a predetermined amount for predetermined periods of time such as five years or twenty years or any such period. In order to receive the carbon credits for the predetermined emissions reduction, verification is required. That is, the entity must prove on a recurring basis—such as yearly—that emissions continue to be reduced by the previously determined amount. Similarly, it is contemplated that verification would or could also be required for any type of carbon valuation such as a carbon tax or a reduction or elimination thereof based on reduced emissions.

In one embodiment, various system embodiments described herein have software that tracks the GHG emissions as described herein and further is programmed to provide automatic, recurring verification of the continuing reduction of GHG emissions in the predetermined amount. In one version, the predetermined amount of reduction is entered into and stored in the system, and the software provides for automatically checking the actual emissions amount for the asset, site, region, or enterprise that is the subject of the promised reduction and comparing that actual emissions amount against the predetermined amount. In one embodiment, the software is further configured to transmit a notification to a user, the enterprise, or a verification body relating to the verification performed by the software.

Tracking or Managing Destruction of Regulated Substances

In various implementations, certain systems and methods disclosed herein provide for tracking and managing the destruction, reclamation, or reconditioning of any regulated substance.

In one embodiment, various embodiments of systems and methods herein provide for calculating and tracking carbon valuation such as carbon credits associated with destruction of certain refrigerants. Certain government programs in the U.S. and elsewhere, including programs that may be currently in place or may soon be in place, provide for incentives for the removal and/or destruction of certain refrigerants. One such program provides credits or other types of financial incentives for removing such refrigerants from a site, region, or enterprise, and/or for destroying such refrigerants. Various system embodiments as described herein provide software that tracks the subject refrigerant and/or refrigerant containers at a site, region, or enterprise. In addition, the software provides for tracking the removal and/or destruction of such refrigerant and/or containers and calculating the resulting financial benefits of such removal and/or destruction. Alternatively, the software can also provide for tracking and managing not only the removal of the containers, but also the reconditioning of the overall system to operate using a different, more environmentally-friendly substance and tracking the resulting benefit in reduced GHG emissions (and the resulting carbon value). Further, the software can provide such information to a user in any useful way in a fashion similar to that relating to carbon valuation such as carbon credits as described elsewhere herein. It is understood that the tracking of the refrigerant can be accomplished as described herein with respect to asset tracking or as described in U.S. patent application Ser. No. 10/429,619, which is incorporated by reference above. It is further understood that the calculation of any carbon valuation associated with the removal and/or destruction of the refrigerant can be performed in a manner similar to the calculation of carbon valuation described elsewhere herein.

Alternatively, the system according to certain embodiments is further configured to maintain a refrigerant removal/disposal provider database that contains information relating to individuals and entities that are certified to remove and/or dispose of the refrigerant, which can be referred to herein as destruction providers or services and removal providers or services. In such embodiments, the system can track and document the successful and compliant removal and disposal of the refrigerant according the any applicable regulations. It is understood that such a system can operate in a fashion similar to the tracking of service or maintenance of an asset as disclosed in U.S. patent application Ser. Nos. 09/883,779 and/or 10/429,619, both of which are incorporated by reference above. In one embodiment, the system has software to automatically access the refrigerant removal/disposal provider database to identify appropriate persons or entities for removing the refrigerant from the asset or location. Additionally, the software can access the same database to identify a certified site/entity/location for disposing of the refrigerant. Further, the software can be configured to track completion of the disposal. In one example, the software transmits a prompt to an appropriate user or certified removal or disposal provider to confirm successful removal and/or disposal of the refrigerant. The software can then transmit a report to an appropriate user and/or third party (such as, for example, the government body overseeing the appropriate regulations) confirming the details of the successful removal and/or disposal.

According to a further implementation, certain systems disclosed herein provide for tracking the transportation and destruction of regulated substances, including the tracking and management of any credits earned (or other type of positive carbon valuation) as a result of the destruction and any GHG emissions created by the transportation and destruction activities. For purposes of this application, "regulated substance" is intended to mean any substance that is regulated by any government worldwide because of its impact on the environment. Examples of regulated substances include any ozone-depleting substance ("OD substance") or any substance that emits GHG or has the potential to emit GHGs when the substance escapes into the air or is destroyed. Another example is any substance having a global warming potential ("GWP") value, especially a high GWP value. Further examples of regulated substances include any such substance as set forth in the "The Montreal Protocol on Substances that Deplete the Ozone Layer," (published as amended in March, 2000 by the Secretariat for The Vienna Convention for the Protection of the Ozone Layer and The Montreal Protocol on Substances that Deplete the Ozone Layer; ISBN 92-807-1888-6). In addition, "regulated assets" shall mean any item, such as a container or an object, that contains or is comprised of a regulated substance. Thus, according to one embodiment, certain systems disclosed herein can calculate the overall carbon impact of the destruction of such substances.

Regulated substances such as OD substances, for example, represent a significant threat to the environment. These substances are often accumulated or simply discarded after their usefulness has run its course. If they are not monitored or destroyed, the regulated substances can leak or emit harmful substances into the atmosphere. Examples of regulated substances include refrigerant used in cooling and refrigerant systems, halon, methyl bromide, and insulating foam utilized as insulation in buildings. Additional examples include substances that can be damaging to the environment that are contained in storage tanks, cylinders, drums, or other vessels or containers, including such containers stockpiled for future use or resale. Further examples can include substances recovered from fire suppression equipment, medical aerosols, and substances recovered from equipment used for commercial refrigeration, industrial process refrigeration, commercial building and residential comfort cooling, motor vehicle air conditioning, and other refrigeration/air conditioning applications. In addition, more examples of regulated substances can be found in the Montreal Protocol discussed above.

To create incentives for the destruction of the regulated substances, some regimes being proposed or implemented in various jurisdictions or treaties include provisions for carbon credits for entities or individuals who destroy their regulated substances. Such provisions could include any type of carbon valuation, such as, for example, a carbon tax for NOT destroying the regulated substances. These regimes typically require specific destruction methodologies and certification before the credits can be awarded to the entity/person destroying their regulated substances. For example, certain regimes such as the Montreal protocol require that the destruction methodology include tracking the chain of custody, the method of destruction, and the destruction certification.

FIG. 12 depicts one embodiment of a system and method 240 that includes tracking any or all of the following: the transportation and destruction of any regulated substances, any GHG emissions associated with the transportation and destruction, and any carbon credits or other type of carbon valuation resulting from the destruction. In this embodiment, the system and method may include collecting and/or entering information about the regulated substance (block 242), collecting and/or entering information about transportation of the regulated substance to the destruction site (block 244), and collecting and/or entering information about the destruction of the regulated substance (block 248). In a further alternative embodiment, the system and method can further include calculating the GHG emissions created as a result of the transportation of the regulated substance (block 246), calculating the GHG emissions created as a result of the destruction of the substance (block 250), calculating or collecting and/or entering any positive carbon valuation such as credits earned (or any negative valuation reduced or eliminated) as a result of the destruction (block 252), and calculating the total carbon impact of the process of destroying the regulated substance (block 254). According to another implementation, the system 240 can also perform a verification step (block 256) relating to the destruction of the regulated substance in which it is confirmed that the substance was destroyed as required under carbon credit regimes in order to be awarded certain credits (or under any other type of carbon valuation regime), which will be described in further detail below.

Alternatively, certain methods and systems herein similar to those set forth in FIG. 12 and discussed above can track the removal and reconditioning or reclamation of any regulated substances using the same or similar steps and system components. It is understood that, according to one embodiment, various types of regulated substances can be removed from a location or an asset and reconditioned or reclaimed and then put back to use. Generally, reconditioning or reclaiming such a substance does not provide for any carbon valuation benefits (no carbon credits or other such units are awarded for such processes), but it may still be beneficial to an entity or user to track such information (including any combination financial costs, energy consumption, GHG emissions, and verification of any step thereof, as each of these are set forth below) using any of the systems or methods described herein with respect to the regulated substances.

It is further understood that certain alternative methods and systems herein similar to those set forth in FIG. 12 and discussed above can track and manage the reconfiguration of one or more assets or one or more asset systems at a location or more than one location, wherein the reconfiguration results in the asset or asset system using a different, more environmentally-friendly substance, and further can track the resulting benefit in reduced negative environmental impact (such as reduced GHG emissions) and thus the resulting positive carbon value. It is understood that these methods or systems can use the same or similar steps and system components as those described in FIG. 12. According to one embodiment, various types of assets or asset systems that use regulated substances of any kind can be reconfigured or replaced such that the reconfigured or replacement asset or asset system actually utilizes a more environmentally-friendly substance. It is further understood that the resulting reduction in GHG emissions can result in the location or entity earning positive carbon valuation units. Thus, systems and methods as disclosed herein can track and manage the replacement or the reconfiguration of the asset or asset system and further calculate the resulting reduced GHG emissions (or other positive impact to the environment) and provide verification of the emissions reduction and calculate and track the positive carbon valuation units (such as carbon credits) earned or the negative carbon valuation units (such as a carbon tax) reduced or eliminated as a result of the reduction. Such tracking and verification of reduced emissions over time and calculation and tracking of the resulting carbon credits or other carbon valuation has been described in some detail elsewhere, and it is understood that such systems and methods could be used in the same fashion to track the benefits of an asset or asset system reconfiguration as described in this paragraph.

According to one implementation, the system used to track the regulated substance destruction can be any system similar to that described above in paragraphs 147 and 148 in which not only the transportation and destruction process is tracked, but also the GHG emissions associated with the transportation and destruction along with any carbon valuation accumulated or awarded as a result of the destruction. In another aspect, the system used to track regulated substance destruction can be any system similar to that depicted in FIG. 2 above, with an appropriate database and appropriate software to track and manage the regulated substance destruction process, along with any related GHG emissions and carbon valuation units.

The regulated substance information collected as set forth in block 242 above can be stored in a database in a fashion similar to the asset information as described above with other system embodiments. In one embodiment, the information can include a unique identifier for the specific regulated substance, type of regulated substance, type of container (if the regulated substance is in a container), site at which the regulated substance is located, information about the impact of the regulated substance on the environment, carbon valuation information such as carbon credits relating to the substance, and any other relevant information about the regulated substance. In one embodiment, the carbon valuation information can include any information about any positive valuation units that could be collected (or negative valuation such as a carbon tax that could be reduced or eliminated) if the regulated substance were to be destroyed and any calculations that would be required to determine the amount of such valuation. Further, the information about the impact of the regulated substance on the environment can include any emissions information relating to the regulated substance, including information about fugitive emissions associated with the regulated substance or any other type of GHG emissions information or information about the carbon or environmental impact of the regulated substance.

The regulated substance transportation information collected as set forth in block 244 above can be stored in a database in a fashion similar to the service provider information as described above with other system embodiments. The transportation information can include the date, time, and location that the regulated substance is collected, the type and amount of regulated substance that is collected, the distance traveled transporting the regulated substance, and the date, time, and location that the regulated substance is unloaded at the destruction site. If more than one mode of transportation or more than one vehicle is used to transport the regulated substance to the destruction site, then the additional information would include the date, time, and location of the transfer from the first vehicle to the second vehicle, in which the term "vehicle" is intended to mean any transportation means that could be used to transport an item such as an regulated substance. Further, the information could include—for each vehicle used to transport the regulated substance—the vehicle type, a unique identifier for the vehicle, the driver's name, the transportation company's name, and additional information about the driver and/or the transportation company, including contact information. As such, the transportation information includes information that relates to the chain of custody as the regulated substance is transported from its original location to the destruction site. It is understood that, in one embodiment, the transportation information relating to the vehicle(s) can include the same type of information collected for any nonstationary assets or emission sources as described above. Thus, the transportation information can include usage information, energy consumption information, and any other information relating to the amount of emissions a source (or sources) has produced (as described in detail above) in transporting the regulated substance, including the total energy consumption of the asset or source. For example, if the vehicle is a mobile combustion source, the information to be collected can include any or all of the type of fuel consumed by the source and the total fuel consumption of the source. In addition, the information can also include the site where the asset or emission source is located, the group that the asset or emission source is a part of, if any, and the date the information was gathered.

The regulated substance destruction information collected as set forth in block 248 above can be stored in a database in a fashion similar to the service provider information as described above with other system embodiments. The destruction information can include any information about the destruction of the regulated substance, including regulated substance destruction provider information, the location of such providers, the date, time, and location that the regulated substance is delivered to the destruction provider, the date and time that the regulated substance is destroyed, energy consumption information relating to the destruction equipment, the cost of the destruction, destruction invoice information, and the destruction equipment. The regulated substance destruction provider information can include any information similar to that for service providers as described above, including the name of the destruction provider, contact information for the provider, the name of at least one contact or technician at the destruction provider, the contact information for the at least one contact or technician, or any other provider information that may be helpful for the tracking and management of the regulated substances. The destruction equipment information can include the type of destruction equipment, the emissions factors or other emissions information relating to the equipment, including any such information necessary to calculate the emissions associated with destruction of one or more regulated substances, and any other relevant destruction equipment information that may be helpful for tracking and management of the regulated substances. It is understood that the destruction equipment information could also include any information similar to the asset information as described above.

With respect to the collection or entry of the information relating to the regulated substance, the transportation, and/or the destruction information as set forth in FIG. 12, it is understood that the information can be entered into the system by any of the methods or devices described above with respect to other system embodiments and other information. That is, the information can be manually entered by a user or automatically entered by the system by any of the methods described above.

According to one embodiment, the step of calculating the GHG emissions relating to the transportation of the regulated substance can be performed in a fashion that is the same or similar to any other GHG emissions calculations performed by any systems described herein. For example, in one embodiment, the GHG emissions relating to the vehicle or vehicles transporting the regulated substance can be calculated by calculating the energy consumption of the vehicle or vehicles and then calculating the GHG emissions based on that information. Alternatively, the GHG emissions can be determined using actual emissions data from a sensor that is coupled to the system via an asset interface.

Similarly, the step of calculating the GHG emissions relating to the destruction of the substance can be performed in a fashion that is the same or similar to any other GHG emissions calculations performed by any systems described herein. For example, in one implementation, the GHG emissions relating to the destruction equipment can be calculated by calculating the energy consumption of the equipment and then calculating the GHG emissions based on that information. Alternatively, the GHG emissions can be determined by actual emissions data from a sensor that is coupled to the system via an asset interface.

It is understood that various destruction and/or carbon valuation regimes require verification of various steps of regulated substance destruction, including verification of the destruction of the substance and verification of the chain of custody during transportation of the substance to the destruction site. As such, various embodiments of the methods and systems disclosed herein provide for tracking and verification of the chain of custody during transportation and/or tracking and verification of destruction of the regulated substances (not shown). In a further embodiment, various embodiments include verification of the carbon valuation calculation (block 256 of FIG. 12). For example, according to one embodiment, verification of the chain of custody in various embodiments of the methods and systems disclosed herein provide for collection or entry of information relating to the acquisition of the regulated substance(s) at the pick-up site, drop-off of the regulated substance(s) at the destruction site, and destruction of the regulated substance(s). Verification, in accordance with one implementation, can include accurate collection and reporting of the pick-up, drop-off, and destruction information to a third party observer or verification entity. Thus, various methods and systems disclosed herein include generating reports including the appropriate information and transmitting those reports to the third party observer or verification entity. Alternatively, the methods and systems disclosed herein can include any necessary verification steps.

According to one embodiment as discussed above, the system for performing the method as set forth in FIG. 12 is a system similar to those described above and depicted in FIG. 2. As described above with respect to other system embodiments, this system has software programs or instructions that run on the server-side to perform all the same or similar functions described above. It is understood that any embodiment of the systems disclosed herein that provide for data collection, storage, tracking, and managing can be controlled using software associated with the system. It is further understood that the software utilized in the various embodiments described herein may be a software application or applications that are commercially sold and normally used by those skilled in the art or it may be a specific application or applications coded in a standard programming language.

It is further understood that the software can be any known software for use with the systems described herein to track, calculate, and manage the various parameters as described herein. For example, as described in further detail herein, various embodiments of the systems described herein could have any one or more of software for calculating GHG emissions resulting from transportation (block 246 of FIG. 12), calculate GHG emissions resulting from destruction (block 250), calculating any positive carbon valuation units earned from the destruction (block 252), calculating the total carbon impact of the destruction (block 254), and, alternatively, performing verification of the destruction (block 256).

In one embodiment, the software for calculating GHG emissions relating to transportation and destruction of the regulated substances (blocks 246, 250) uses energy consumption data according to methods and calculations similar to those described above with other systems. That is, as described above with other embodiments, the software can utilize the energy consumption information collected relating to the transportation of the regulated substance(s) to calculate an estimated amount of GHG emissions relating to the transportation of the regulated substance(s). Alternatively, the software can utilize actual emissions information from an asset interface associated with the vehicle transporting the substance(s). In a further embodiment, the software can utilize the energy consumption information collected relating to the destruction equipment during destruction of the regulated substance(s) to calculate an estimated amount of GHG emissions relating to the destruction of the substance(s). Alternatively, the software can utilize actual emissions information from an asset interface associated with the destruction equipment.

In a further implementation, the system can have software configured to calculate the positive carbon valuation units earned (or negative carbon valuation units reduced or eliminated) as a result of the destruction of the regulated substance(s) (block 252). That is, the software can determine the carbon valuation units available for the destruction of a particular regulated substance by utilizing the regulated substance information or by connecting to a third party such as a carbon valuation regime to acquire the appropriate information. In one embodiment, the carbon valuation units that can be earned for destruction of a particular substance can be calculated based on the GWP value for the substance, which can be calculated based on the amount of the substance and the $CO_2$ equivalent number for the substance, as explained above. Alternatively, the software can calculate the carbon valuation units such as carbon credits by any known method.

The system also has software configured to calculate the total carbon impact of the substance destruction. That is, the software utilizes the above emissions information and the carbon valuation information to calculate the overall carbon impact of the substance destruction. For example, the software according to one embodiment calculates the total GHG emissions relating to the combination of the transportation and destruction of the regulated substance(s), and then calculates the positive carbon valuation units (such as carbon credits) earned or negative carbon valuation units (such as a carbon tax) reduced or eliminated based on that destruction. The software further compares the total GHG emissions to the carbon valuation to determine if the amount of the valuation units earned (or negative units reduced or eliminated) exceed the GHG emissions or are less than the GHG emissions. The comparison can be expressed as a total carbon impact. For example, if the earned valuation units exceed the GHG emissions, then the total carbon impact of the destruction is positive (meaning that there is an overall reduction in GHG emissions because of the destruction of the regulated substance). On the other hand, if the earned valuation units are less than the GHG emissions, then the total carbon impact is negative (meaning that there is an overall increase in GHG emissions because of the destruction of the regulated substance).

In a further embodiment, it is understood that the system also has software configured to calculate the total financial cost of the substance destruction. That is, the software utilizes the above energy consumption information, the emissions information, and the carbon valuation information to calculate the overall financial cost of the substance destruction. For example, the software according to one embodiment calculates the total energy consumption relating to the transportation and/or destruction of the substance, the GHG emissions relating to the transportation and/or destruction of the regulated substance(s), and then calculates the positive carbon valuation units (such as carbon credits) earned or negative carbon valuation units (such as a carbon tax) reduced or eliminated based on that destruction. The software further compares the total GHG emissions to the carbon valuation as described above to determine if there was an overall positive or negative carbon valuation as a result of the transportation and destruction of the substance(s). The total financial cost of the substance destruction can then be calculated by the software based on the total energy consumption and the overall carbon valuation. In a further embodiment, any further costs or profits resulting from the destruction can also be included.

According to another implementation, the systems and methods described above relating to tracking and managing the transportation and destruction of one or more regulated substances are similar to and can have the same or similar components and be operated in a similar or the same fashion as the product carbon footprint tracking systems described elsewhere herein.

For example, in one embodiment, the verification can occur in the following manner. A user (such as, for example, a user at a third party verification entity) can utilize a client computer to access a system embodiment as described herein and access any of all of the substance, transportation, and/or destruction information relating to a particular container or item of a regulated substance, a group of such containers or items, all containers or items from a particular location, or any other cross-section of information that the user or entity desires. The user may also run, or otherwise instruct or request the system to produce, a report containing any desirable portion of that information or any other information relating to one or more regulated substances. The user can then utilize the information accessed on the system or provided in the report and compare it to a manifest (or other external source of information) of the transportation provider or the destruction service to determine if the information collected and stored in the system is the same as the manifest or other external information. If the information is the same, this can serve as verification, or at least evidence of, the destruction or chain of custody. If the information is different, it may serve as evidence that further investigation is warranted.

Predictive Analysis and Planning and Management Based on the Analysis

In another embodiment, certain systems and methods described herein can provide for predictive analysis and planning based on the emissions information and calculations described above (or on the refrigerant information wherein the refrigerant is subject to removal and/or destruction), including predictive analysis and planning and/or adjustment of emissions based on the calculations of carbon valuation surplus or debt as described above. In one embodiment, such a system or method is similar to or operated in conjunction with one of the systems and methods providing predictive analysis and preventative planning as described in U.S. application Ser. No. 11/423,860, which is discussed and incorporated by reference above. Such a system or method could include software that draws upon the calculations discussed above to predict future trends in the data. The enterprise or a user can then utilize a predicted trend and the above information to take appropriate steps to address any predicted impact of the trend. According to one exemplary embodiment, predicted weather patterns can be used to predict a trend in energy use and thus GHG emissions. For example, perhaps a particularly cold winter has been predicted. The system, according to one embodiment, can compare the predicted winter season with past correlations and/or calculated correlations between similar winter seasons and GHG emissions. Based on the correlations, the system can predict the impact of the cold winter season on the amount of GHG emissions for a site or a group of sites in the region impacted by the cold weather.

In another exemplary embodiment in which each site has been mapped with GIS capabilities as disclosed in U.S. application Ser. No. 10/771,090, which is incorporated herein by reference in its entirety, the system can compare a predicted path of a weather event (such as a cold snap or heat wave, etc.) with site locations using a map-based interface and identify the sites of the enterprise predicted to be directly affected by the weather. The system can further calculate and/or notify a user or users of the predicted GHG emissions. In another exemplary embodiment, a predicted temperature spike across a certain region can be used to predict expected GHG emissions relating to electricity, etc.

According to one embodiment, preventative action can then be taken by the user or the enterprise based on the predicted information provided by the system. In one embodiment, the user takes action based on the predicted information provided by the system. In the example of the predicted winter season, the user can take such steps as reducing energy consumption and thereby reducing emissions at unaffected sites in anticipation of increased emissions at the affected sites, or any other appropriate action to prepare for the expected increase in emissions.

Alternatively, the preventative action is implemented by the system. That is, the system allows for data and predictive analysis, including predicting certain trends relating to certain assets or equipment, and upon the triggering of a certain event associated with those predictions, electronically communicating or transmitting operating instructions to the relevant piece of equipment via the asset/equipment interface associated with that piece of equipment, similar to that described above with respect to FIG. 2. Thus, the asset/equipment interface capabilities can be used in conjunction with the data and predictive analysis capabilities as described above to provide for preventative action or action to address the impact of a predicted trend.

In one embodiment, the asset/equipment interface capabilities can be utilized to remotely control operating parameters of certain energy or energy-related systems at a site, as disclosed in further detail in U.S. application Ser. No. 10/734,725, which is mentioned and incorporated by reference above, to accomplish measures intended to prevent or reduce any negative impact of predicted phenomenon as described above. Thus, the system according to one embodiment allows for tracking various parameters relating to equipment at a site or multiple sites, performing data and predictive analysis, and upon the triggering of a certain event or predicted event associated with those parameters, electronically communicating or transmitting operating instructions to the equipment to thereby impact GHG emissions in some way. According to one embodiment, the types of equipment that can be remotely controlled in this fashion include, but are not limited to, refrigeration, lighting, and HVAC equipment and systems, or any other GHG emitting equipment of any kind.

In the example of the predicted cold winter season, the predicted cold temperatures can trigger the system to electronically communicate instructions to the HVAC systems and, in some embodiments, additional power consuming systems of unaffected sites to reduce power output of those systems, thereby reducing the GHG emissions associated with that equipment, which, in some embodiments, allows the enterprise to conserve carbon valuation units such as carbon credits in any carbon valuation market that may be established by an organization or government such as the carbon valuation market described above. In the example of the predicted temperature spike, the predicted high temperatures could trigger the system to electronically communicate instructions to the HVAC systems of unaffected sites to reduce power output of those systems, thereby reducing the GHG emissions at those sites and, in some embodiments, conserving the enterprise's carbon valuation units to compensate for the increased emissions at the affected sites.

In either of the above examples, the instructions transmitted by the system can be further impacted by the system's consideration and analysis of the market demand information and carbon valuation rate information in addition to the predicted weather trends. According to one embodiment, the predicted weather pattern results in a predicted demand and/or carbon valuation rate that triggers instructions transmitted by the system to the relevant equipment through the appropriate interface or interfaces based on the predicted rate. Alternatively, real-time or nearly real-time rate information can be inputted into the system of the present embodiment and based on the carbon valuation (such as carbon credit) rate, the system can be triggered to transmit various instructions from the system to the relevant equipment through the appropriate interface or interfaces. For example, in the cold temperature example above, the server software may predict a certain carbon valuation rate that triggers an electronic instruction to be transmitted to the equipment at the affected site or sites instructing the HVAC systems to reduce output by some predetermined percentage during the predicted peak rate period(s) to reduce emissions and thus the expense of the carbon valuation units required for those emissions. Thus, the market demand and carbon valuation rate information can be taken into account in providing instructions to the relevant equipment and/or sites. In a further alternative, the system can be triggered by any number of different parameters to communicate with various equipment to implement preventative or remedial actions in response to a predicted trend.

According to one embodiment, the method and/or system can generate emission reports (block 206 of FIG. 10). Generally, an emission report can include any desired information about an identified emission source or group of emission sources, including without limitation, the emission source identifier, the type and/or subtype, the site location, and the total amount of emissions produced. According to one embodiment, the total amount of emissions includes the amount of GHGs produced. Alternatively, the total amount of emissions includes the amount of $CO_2$ and $CO_2e$ produced, expressed in metric tons of carbon dioxide.

FIG. 13 depicts one method of generating an emissions report 260, according to one implementation. This particular method includes selecting a time period over which emissions production is to be calculated (block 262), selecting a particular emission source, or group of emission sources for which emission production is to be calculated (block 264), generating an emission report on the basis of the selected time period and selected emission sources (block 266), and making the report available for dissemination (block 268).

A report may be requested for any time period (block 262), according to one embodiment. For example, an emissions report may be requested for the amount of emissions produced in the preceding day, week, month, or year. Alternatively, a report may be requested for any time period.

A report may also be requested for any emissions source or any group of emissions sources (block 264), according to one implementation. For example, in some embodiments, a report request may be made for all of an enterprise's emission sources. Alternatively, a report request may be made on the basis of site location, source type or subtype, or any combination thereof.

Typically, a report request is initiated by a user located at a remote site through the use of an enterprise processor or client computer similar to those in FIG. 2. Alternatively, the request can be initiated by anyone with access to the system. For example, the request could be requested by any user with access to the system over the internet.

Upon initiation, according to one embodiment, the server utilizes the parameters provided by the user to retrieve the appropriate information from the asset database and generate the report (block 266). Subsequently, the emissions report can be made available for dissemination (block 268). In some embodiments, the report is only made available for dissemination within the enterprise internally. For example, the report may be automatically distributed to predetermined recipients within the enterprise. Alternatively, the report may, in accordance with applicable laws and regulations, be made available for dissemination to individuals or entities external to the enterprise, such as, for example, local, state, or federal governmental agencies. In one embodiment, the report is generated and distributed in hardcopy. Alternatively, the report is generated and distributed electronically, such as via e-mail or a webpage. In a further alternative, the report can be generated in any known form and any known fashion.

Tracking, Managing, or Optimizing any Parameter

As mentioned above, according to various embodiments, the systems and methods disclosed herein can utilize all of the information relating to the one or more assets, the one or more regulated substances, the one or more sites, the one or more regions, or an entire enterprise to calculate overall financial costs, overall "true" costs, and perform optimization and management operations based on such information.

In one embodiment, the various system embodiments described herein provide for a method of calculating a total financial cost of an asset, site, region, or enterprise. As described above, the system has software to calculate a total cost of ownership of a piece of equipment, a site, a region, or an entire enterprise. In a further implementation, the system also has software to calculate a total overall financial cost, which includes the cost of ownership (which includes the costs of energy consumption) and combines the costs of any GHG emissions (such as refrigerant leakage) that require replenishment along with the costs or profits associated with any carbon valuation units such as carbon credits gained or lost as a result of operating the subject asset or site. In one exemplary embodiment, the software can calculate a total ownership cost for an asset as described above, add any cost of replenishment of any fugitive emissions (such as leaked refrigerant, for example) and then access any information about any carbon valuation associated with that asset and add that to the total cost calculation. If the asset has accumulated any positive tradable carbon valuation units such as carbon credits which have then been sold, the sale amount is applied to reduce the total amount of the ownership cost. Alternatively, if the asset has exceeded some level of emissions and made it necessary to purchase any carbon credits on the market, the purchase amount is applied to increase the total amount of ownership cost.

In one implementation, the software calculates a total financial cost of ownership of a piece of equipment, site, region, or enterprise using at least the purchase cost of the equipment, the repair costs associated with the equipment, and the energy consumption cost of the equipment (including, of course, any cost reductions based on any rebates or refunds, etc., as described above). Alternatively, the software can calculate a total financial cost of ownership of an asset, site, region, or enterprise based on any additional parameters that contribute to the total financial cost, including, for example, any carbon credits or other type of carbon valuation units that are accumulated (or a negative carbon valuation such as a carbon tax that is reduced or eliminated) by the asset, site, region, or enterprise. The software can access all the relevant information within the system itself, thereby allowing for easy, and in some embodiments automatic, calculation of total costs that can then be transmitted to a user or generated in a report and transmitted to one or more users.

In one embodiment, the software can calculate the total financial cost for any desired period, such as a year, five years, or the known lifetime of the asset (or site, etc.). In a further embodiment, the software can combine the total financial costs of all the assets at a site or all the sites in a region for any desired period. In yet another embodiment, the software can also utilize the predictive analysis and planning capabilities described herein to provide estimates for ongoing financial costs for an asset, site, or region for some predetermined future period such as the next year, two years, or any other desirable period. In this way, the software and systems described herein can be used to provide highly accurate estimates of the costs of operating an asset, site, or region. As described in further detail elsewhere herein, the system can also be configured to generate reports of this information and transmit them to an appropriate recipient or recipients, thereby allowing the user to utilize the past total financial costs and/or estimated future total financial costs to make operational decisions.

According to another embodiment, it is understood that the systems described herein can calculate a total financial cost for the destruction of one or more regulated substances using the same or similar components, software, and processes described herein.

In accordance with a further embodiment, the various system embodiments described herein provide for a method of calculating a "true cost" of an asset, site, region, or enterprise. "True cost" as defined herein is intended to mean the total financial and environmental costs associated with an asset, site, region, or enterprise. In a further alternative, the "true cost" can also include public relations costs of operation of an asset, site, region, or enterprise. Thus, according to one implementation, one or more of the systems described herein have software to calculate a total overall true cost, which includes the total financial cost (including energy consumption costs, total cost of ownership, and any financial impact of any carbon valuation) along with total GHG emissions for an asset, site, region, or enterprise. In one exemplary embodiment, the software can calculate a total financial cost for an asset as described above and separately calculate a total amount of GHG emissions (which amount can be used to describe the carbon footprint or the "greenness" of the asset, site, region, or enterprise). The software can also utilize any other calculable parameter of environmental impact to arrive at the total carbon footprint or environmental impact of the asset, site, region, or enterprise.

As with the total financial cost calculation above, the software for calculating the "true costs" can access all the relevant information within the system itself, thereby allowing for easy, and in some embodiments automatic, calculation of total true costs that can then be transmitted to a user or generated in a report and transmitted to one or more users. In one implementation, the report can contain a total financial costs amount and separately a total emissions amount or carbon footprint calculation of some kind. Alternatively, the total true cost can be presented in any appropriate form.

In one embodiment, the software can calculate the total true cost for any desired period, such as a year, five years, or the known lifetime of the asset (or site, etc.). In a further embodiment, the software can combine the total true costs of all the assets at a site or all the sites in a region for any desired period. In yet another embodiment, the software can also utilize the predictive analysis and planning capabilities described herein to provide estimates for ongoing true costs for an asset, site, or region for some predetermined future period such as the next year, two years, or any other desirable period. In this way, the software and systems described herein can be used to provide highly accurate estimates of the true costs of operating an asset, site, or region. As described in further detail elsewhere herein, the system can also be configured to generate reports of this information and transmit them to an appropriate recipient or recipients, thereby allowing the user to utilize the past total true costs and/or estimated future total true costs to make operational decisions.

According to another embodiment, it is understood that the systems described herein can calculate a total true cost for the destruction of one or more regulated substances using the same or similar components, software, and processes described herein.

In one embodiment, the various system embodiments described herein provide for a method of analyzing and/or optimizing one or more operational parameters relating to the total financial costs or true costs of an asset, site, region, or enterprise. As disclosed above, the system has software to track the total financial costs and total true costs, including all parameters that contribute to both. Further, various embodiments of the systems described herein also have software that allows for analysis (including predictive analysis) and/or optimization of a desired parameter relating to the financial and true costs. Such software, according to one implementation, tracks total financial and true costs and all related parameters or inputs and utilizes historical data relating to those calculations and parameters, along with the predictive analysis and planning capabilities described elsewhere herein, to provide highly accurate estimates of the effects on the total financial or true costs of adjusting any of the inputs, such as energy consumption, GHG emissions, etc.

In one example, a user or entity may desire to obtain an estimate of the costs of reducing GHG emissions at a site by some predetermined amount. The user enters this predetermined amount into the system and the analysis software utilizes the amount to calculate an estimate of the impact of such GHG emissions reduction on the total financial costs of the site, including the impact on the energy consumption costs and the total cost of ownership of the assets at the site and the carbon valuation at the site. In one embodiment, the software utilizes the predictive analysis and planning capabilities described elsewhere herein to determine the impact on the total costs of ownership as a result of any asset upgrade or modification required to achieve the emissions reduction, or any other associated cost increase, while also estimating any profits associated with an increase in the number of positive carbon valuation units such as credits accumulated as a result of the emissions reduction. In another embodiment, the software can also calculate a true cost of the GHG emissions reduction as well.

In another example, the user or entity may desire to obtain an estimate of the costs of increasing energy consumption as a result of an expansion at a site or the addition of a new site. The user enters the predetermined information about the new additional assets to be added as a result of the expansion/addition into the system and the analysis software utilizes the amount to calculate an estimate of the impact of such an increase in energy consumption costs and total ownership costs on the GHG emissions and carbon valuation at the site. In one embodiment, the software utilizes the predictive analysis and planning capabilities to determine the impact on the GHG emissions as a result of the addition of new or additional GHG emitting assets in the expansion or new site, while also estimating any increased costs associated with any carbon valuation debt created by the increased emissions. Further the software also considers any other parameters that may be impacted by the expansion/addition. In another embodiment, the software can also calculate a true cost of the expansion/addition as well.

In a further example, a particular enterprise site—Site A—is supplied with electricity by Utility X, which charges the enterprise an amount measured in dollars per kilowatt-hour ($ per kwh). In this example, the eGRID factors have been calculated with respect to Utility X based on the power generation mix of the utility.

In addition, in this example, Site A has at least one on-site power generation source as well (such as a diesel backup generator, wind-power microturbine, solar array, or any other kind of power generation source. Obviously, the on-site power sources each have a financial cost of operation, along with GHG emissions as a result of operation.

In this example, the system has predictive analysis software as described above that utilizes past energy consumption at Site A to identify times/seasons/periods when consumption is typically at its highest or lowest and further to identify the behavior or usage activity that leads to increased or reduced power consumption. Thus, the software utilizes past data in combination with predictive factors (such as ambient temperature or seasonal information) to predict the expected price per kwh from Utility X during the expected event (peak usage hours, heat wave, season, or any other event) and thus the expected costs, in combination with a calculation of the expected GHG emissions, thereby providing a carbon impact as well (along with any additional financial costs or benefits relating to carbon valuation). Thus, the software can provide expected financial costs and expected carbon impact, thereby also providing an expected "true" cost as defined herein.

Using the information provided as described in the previous paragraph, certain decisions can be made or changed—either automatically by the software or manually by a user—related to any number of operational parameters at the site (such as, for example, which assets will be operated under what operating parameters or what activities are conducted at the site). These operational adjustments can be made in advance of the event based on the predictive analysis. That is, operational parameters can be adjusted based on the information provided by the predictive analysis software to adjust any adjustable parameter associated with energy consumption, including energy consumption reductions of any kind (based on asset, timing, cycle, etc.). In a further embodiment, the software also includes an optimization component that identifies optimal levels of consumption, cost, or GHG emissions and adjusts the various parameters as described herein to attain the optimal level or levels.

Any other analysis of this kind is also possible with the analysis software and all the information available in various embodiments of the systems and methods described herein.

In a further exemplary embodiment, the user or entity may desire to obtain an estimate of the optimal combination of operational parameters to operate an asset, site, region, or enterprise in such a fashion that it results in the lowest total financial costs and lowest GHG emissions. In the example of a site, the optimization software utilizes the known information relating to all assets at the site, including all energy consumption information and operational cost information (including any maintenance and other costs), along with all GHG emissions information and carbon valuation information to calculate the appropriate operational parameters to optimize costs and emissions. For example, the software might calculate that the energy consumption, and thus emissions, can be reduced by reducing operation of the energy consuming assets at certain periods each day or each week. Alternatively, the software might calculate that increased consumption at certain points combined with decreased consumption at others might be optimal to reduce overall costs and emissions. In a further example, the software can calculate appropriate consumption based at least in part on the demand-response and/or rebate or cost savings programs provided by the utilities or energy sources and further based on carbon valuation such that operation of various assets is determined based on the programs to reduce costs and emissions. In yet another example, the software can determine any optimal combination of the parameters and provide that information in the form of report that is generated by the system via a report generation process that is described in further detail herein.

In another embodiment, the analysis and optimization software described above can operate in conjunction with asset interfaces (such as those interfaces 66 depicted in FIG. 2 and/or described elsewhere herein) to transmit operation instructions to certain assets to implement the optimization strategy or preferred operational parameters as calculated by the software.

In a further embodiment, the analysis software can be used to implement a procurement project for an enterprise. That is, the software can provide appropriate analysis to calculate the total financial and true costs of a procurement project associated with an expansion, modification, or addition of assets to an enterprise. In one embodiment, the software allows a user to create a procurement budget based on asset information already stored in the system. The procurement budget can be a financial budget and/or an emissions budget. Further, the budget can be an installation budget (cost of getting the site constructed), an operational budget (cost of operating the site), or a combination of both. That is, all asset information is available, such as purchase costs, operational costs (such as estimated maintenance and repair), and expected emissions, and all this information can be included in the budgets. Once the budget has been established, the software can also track the actual costs as the addition of assets is completed and operation begins. Further, the software can provide analysis or budget adjustments based on alterations in the parameters such as type of equipment and/or operation of the assets after installment.

In one example, an enterprise may wish to add an additional site. A user enters the desired assets for the site, and the software can utilize that information to calculate an estimated financial budget for installation, an estimated financial budget for operation, an estimated overall financial budget for both installation and operation, and an estimated emissions/carbon footprint budget based on the expected emissions of each asset. In one embodiment, the software can also calculate an optimal mix of assets and operational parameters to minimize the overall financial budget for installation and operation. For example, the software might utilize the combined installation/operation budget to calculate that it is more cost efficient in the long term to purchase a more expensive asset that is more efficient and/or emits fewer GHGs than another model by calculating for example that the reduced energy consumption reduces operational costs over time or the reduced emissions results in more positive carbon valuation units such as carbon credits that can then be sold at a profit.

Alternatively, the analysis software can utilize any parameter and any calculation to optimize the procurement strategy for an enterprise.

According to another embodiment, it is understood that the various system embodiments described herein provide for methods of analyzing and/or optimizing one or more operational parameters relating to the total financial costs or true costs of the destruction of one or more regulated substances using the same or similar components, software, and processes described herein.

Tracking and Aggregating Operating Parameters for Multiple Enterprises or Entities According to various additional embodiments, the systems and methods disclosed herein can utilize all of the information disclosed above relating to more than one enterprise to calculate aggregate energy consumption, aggregate energy consumption costs, aggregate GHG emissions, or any other trackable or calculable parameter as described herein, including aggregate destruction of regulated substances.

Various entities, including government entities (such as cities, counties, states, and/or nations), may have an interest in tracking and calculating aggregate amounts of energy consumption, GHG emissions, or any other information that can be tracked and/or calculated herein across more than one enterprise. For example, a state or city entity may have an interest in collecting and calculating an aggregate carbon footprint for all companies or entities within its borders. Thus, certain embodiments of the systems described herein can be utilized for such tracking and calculation.

It is understood that such systems allow for access by an appropriate person or persons from each entity or enterprise from which information is to be collected. In one example, the system can provide a website through which the entity or enterprise information can be entered. Alternatively, the system can provide any access/entry point as described herein, such as a client computer or kiosk.

The system has software and existing information/calculations that can assist and/or prompt the user for information entry. For example, the system can have a website that provides "drop down" boxes with standard choices for various categories such as number of assets of a certain kind (vehicles, HVAC systems, etc.) and type of assets (brand, model, etc.). Further, as described above with respect to the enterprise-level systems, the system has software to calculate an aggregate energy consumption, an aggregate energy consumption cost, an aggregate amount of GHG emissions, etc., for all participating entities or enterprises across a predefined area.

In one example, a state may be interested in determining the aggregate GHG emissions by the companies and entities within its borders. The state could utilize an implementation of system described herein to provide system access to each company/entity. In example, access is provided via a website. Each company/entity then enters its energy consumption and/or GHG emissions information as prompted by the system. The system stores the information in a database and software utilizes the information to calculate the total aggregate GHG emissions by the companies and entities in the state.

In one implementation, the various system embodiments described herein also provide for data analysis, including data correlation and predictive analysis, as described above. That is, according to one embodiment, these systems include software that can utilize the aggregate information stored, assimilated, or used by the system to identify correlations with other information and utilize those correlations to predict trends and provide information relating to the predicted or expected changes in consumption, emissions, etc., as described above. More specifically, such software, according to one implementation, can track aggregate energy consumption, energy consumption costs, GHG emissions, or any other parameter and utilize historical data relating to those calculations and parameters, along with the predictive analysis and planning capabilities described elsewhere herein, to provide highly accurate estimates of the effects on the various parameters (such as costs or emissions) of adjusting any of the inputs, such as energy consumption, GHG emissions, etc.

According to one embodiment, the system also has software for generating reports relating to the aggregate information and/or analysis described above. That is, the software can automatically generate reports relating to the calculated aggregate totals, other calculated information, or predicted trends and transmit those reports or information to the appropriate government body, enterprise, or user, who can utilize the information to make strategic decisions and act on those decisions.

It is understood that embodiments of this system can operate similarly to the asset, site, region, and enterprise-level systems disclosed herein, providing similar tracking and calculation of the various parameters as discussed throughout this document. However, the instant embodiments allow for entry of such information for more than one enterprise or entity and provide for tracking and calculating aggregate amounts of the various parameters discussed herein.

Tracking Production Carbon Footprint of Products, Services, or Assets

Figure 14:
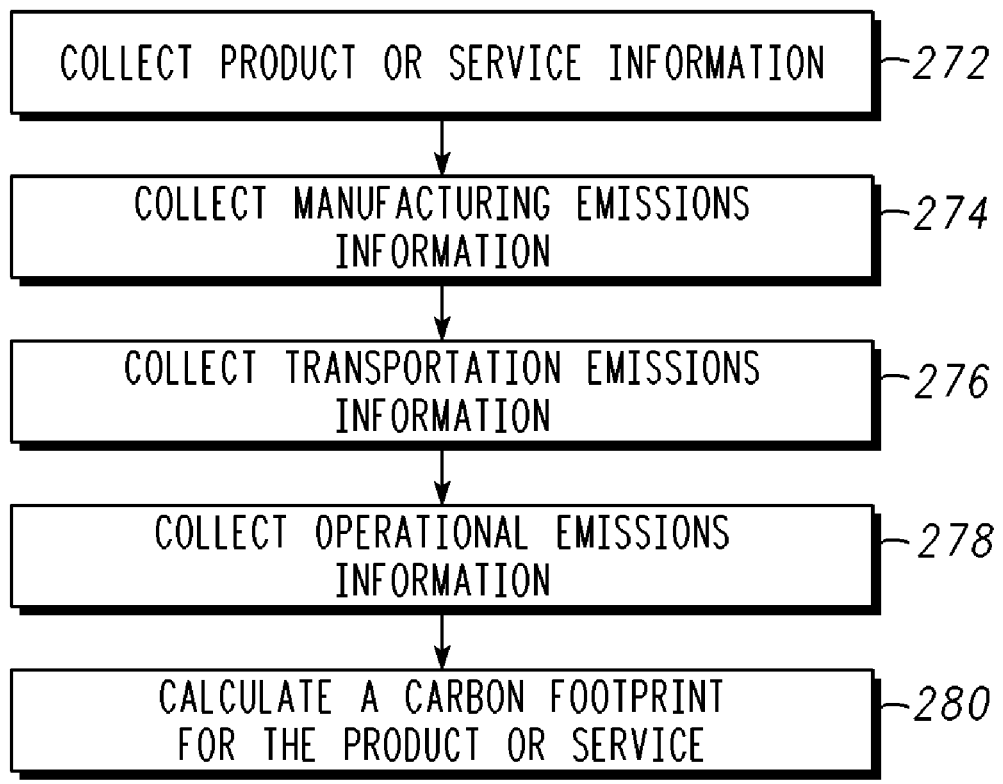
FIG. 14 is a flow chart depicting a method of tracking a production carbon footprint of a product, service, or asset, according to one embodiment.

According to another embodiment, FIG. 14 depicts a method of tracking the production carbon footprint of any product, service, or asset 270, where "production carbon footprint" as used herein is intended to mean any GHG emissions that are produced in the creation of the product, service, or asset and/or in the transport of the product, service, or asset to the destination where the product, service, or asset will be sold. Such a method can be implemented easily with the various systems described herein. The method 270 generally includes collecting product, service, or asset information (block 272) such as identification information and other basic information, collecting manufacturing emissions information (block 274), which includes any emissions associated with the creation and/or packaging of the product, service, or asset, collecting transportation emissions information (block 276) associated with any transport of the product, service, or asset prior to sale, collecting any operational emissions information (block 278) relating to any estimated GHG emissions that occur as a result of the operation or use of the product, service, or asset, and calculate a carbon footprint for the product, service, or asset based on the collected information (block 280).

As the nation and the world become more focused on the greenhouse gas emissions, the environmental impact of those gases, and "carbon friendly" products and services, companies and other entities (and their customers) are becoming more interested in knowing the environmental impact (including the carbon footprint) of the various products, services, and equipment that those entities purchase. To that end, a company may want to track the production carbon footprint of the assets or equipment that the company purchases to use at its locations. The company may also want to track the production carbon footprint of the products and/or services that the company purchases to sell to customers.

Various embodiments of the systems described herein can be used to track the production carbon footprint of a product, service, or asset. The basic product, service, or asset information can be collected (block 272) and entered into the system via a client computer or any other entry method Further, the manufacturing emissions information (block 274) and the transportation emissions information (block 276) can be collected, entered, and/or calculated in a similar fashion that the emissions information associated with an asset is entered and calculated above (such as via energy consumption information and formulas as discussed above, for example). Further, an estimate of operational emissions for a product, service, or asset can also be collected (block 278) or calculated and entered into the system. The system software can then utilize the emissions information to calculate a carbon footprint for the product, service, or asset (block 280). According to one embodiment, the production carbon footprint is an estimated emissions number. Alternatively, the production carbon footprint could be some type of predetermined score or rating that is used to compare the product, service, or asset to other products, services, or assets. In a further alternative, a carbon footprint could be determined based on only the manufacturing emissions. In a further alternative, the carbon footprint could be determined based on only the transportation emissions or the operational emissions information. In yet another alternative, any combination of emissions information could be used to calculate a carbon footprint.

In one example, a widget is manufactured in China. In one embodiment, the basic information about the widget, such as a unique identifier and basic information about the widget, is entered into the system and stored in a database. Further, manufacturing emissions information is also entered. According to one embodiment, the manufacturing emissions information is calculated at the manufacturing site based on actual emissions tracking or calculation of emissions based on energy consumption, as described above. Alternatively, manufacturing emissions can be estimated in some fashion.

The widget is then transported to the United States. The transportation emissions are then entered into the system. In one embodiment, the transportation emissions are calculated based on the actual emissions of the planes or ships that transport the widget or a calculation of emissions based on energy consumption, as described above. Alternatively, transportation emissions can be estimated in some fashion.

In an alternative embodiment, an operational emissions amount can also be factored into the calculation. In one embodiment, the operational emissions amount is an estimate based on historical data for that type of widget and the estimated life of the widget. Alternatively, the operational emissions amount can be calculated in any appropriate fashion.

The software then utilizes the emissions information stored above to calculate a total emissions amount, thereby finding a production carbon footprint for the widget. The production carbon footprint can then be provided in a report or other form of communication to a user. Alternatively, the production carbon footprint can be utilized in any appropriate fashion.

Although certain inventions have been described herein with reference to preferred embodiments, persons skilled in the art will recognize that changes may be made in form and detail without departing from the spirit and scope of those inventions.

What is claimed is:

1. A network-based system for managing the destruction of a regulated substance, the system comprising:
    (a) a central processor accessible on a computer network;
    (b) a database in communication with the central processor, the database configured to store
        (i) emissions information relating to at least one regulated substance;
        (ii) energy consumption information relating to transportation and destruction of the at least one regulated substance;
        (iii) carbon valuation information relating to the destruction of the at least one regulated substance;
    (c) emissions tracking software associated with the central processor, the emission tracking software configured to calculate and track the emissions information relating to the transportation and the destruction of the at least one regulated substance;
    (d) carbon valuation tracking software associated with the central processor, the carbon valuation tracking software configured to calculate and track the carbon valuation information relating to the destruction of the at least one regulated substance; and
    (e) total carbon impact software associated with the central processor, the total carbon impact software configured to calculate and track total carbon impact information relating to the destruction of the at least one regulated substance based on the emissions information and the carbon valuation information.

2. The system of claim 1, further comprising energy consumption tracking software associated with the central processor, the energy consumption tracking software configured to calculate and track the energy consumption information relating to the transportation and the destruction of the at least one regulated substance.

3. The system of claim 1, wherein the emissions tracking software is configured to calculate and track the emissions information based on the energy consumption information.

4. The system of claim 3, wherein the emissions tracking software is configured to calculate and track the emissions information based on actual emissions information.

5. The system of claim 1, further comprising report software associated with the central processor, the report software being configured to generate reports relating to verification of the destruction of the at least one regulated substance.

6. The system of claim 5, wherein the report software is further configured to transmit the reports to a third party verification entity.

7. The system of claim 5, further comprising notification software associated with the central processor, the notification software being configured to transmit the reports to a third party verification entity.

8. The system of claim 1, further comprising a client processor in communication with the central processor, wherein the client processor is configured to allow for accessing, inputting, querying, downloading, and requesting reports relating to any of the emissions information, the energy consumption information, the carbon valuation information, or the total carbon impact information.

9. The system of claim 1, wherein the emissions tracking software is configured to calculate and track the emissions information relating to the transportation and destruction of all of the at least one regulated substances at least two sites.

10. The system of claim 1, wherein the emissions tracking software is configured to calculate and track the emissions information relating to the transportation and destruction of all of the at least one regulated substances of an enterprise.

11. The system of claim 1, further comprising optimization software associated with the central processor, the optimization software configured to modifiable to calculate and track optimal targets based on any one or more of the emissions information, the carbon valuation information, and the total carbon impact information.

12. A network-based system for managing the destruction of a regulated substance, the system comprising:
    (a) a central processor accessible on a computer network;
    (b) a database in communication with the central processor, the database configured to store
        (i) emissions information relating to at least one regulated substance;

(ii) energy consumption information relating to transportation and destruction of the at least one regulated substance;
(iii) carbon valuation information relating to the destruction of the at least one regulated substance;
(c) emissions tracking software associated with the central processor, the emission tracking software configured to calculate and track the emissions information relating to the transportation and the destruction of the at least one regulated substance;
(d) carbon valuation tracking software associated with the central processor, the carbon valuation tracking software configured to calculate and track the carbon valuation information relating to the destruction of the at least one regulated substance; and
(e) verification software associated with the central processor, the verification software being configured to transmit verification information comprising verification of the destruction of the at least one regulated substance to any third party verifier or verification entity.

13. The system of claim 12, further comprising total carbon impact software associated with the central processor, the total carbon impact software configured to calculate and track total carbon impact information relating to the destruction of the at least one regulated substance based on the emissions information and the carbon valuation information.

14. The system of claim 13, further comprising optimization software associated with the central processor, the optimization software configured to modifiable to calculate and track optimal targets based on any one or more of the emissions information, the carbon valuation information, and the total carbon impact information.

15. A network-based system for managing the destruction of regulated substance, the system comprising:
(a) a central processor accessible on a computer network;
(b) a database in communication with the central processor, the database configured to store
(i) emissions information relating to at least one regulated substance;
(ii) energy consumption information relating to transportation and destruction of the at least one regulated substance;
(iii) carbon valuation information relating to the destruction of the at least one regulated substance;
(c) emissions tracking software associated with the central processor, the emission tracking software configured to calculate and track the emissions information relating to the transportation and the destruction of the at least one regulated substance;
(d) carbon valuation tracking software associated with the central processor, the carbon valuation tracking software configured to calculate and track the carbon valuation information relating to the destruction of the at least one regulated substance; and
(e) comparison software associated with the central processor, the comparison software configured to compare and calculate a difference between the emission information relating to the transportation and the destruction of the at least one regulated substance and the carbon valuation information relating to the transportation and the destruction of the at least one regulated substance; and
(f) analysis software associated with the central processor, the analysis software configured to identify at least one operating adjustment to at least one of transportation and destruction of the at least one regulated substance if all emissions associated with the transportation and destruction of the at least one regulated substance exceed all emissions allowed by any positive carbon valuation earned by the destruction of the at least one regulated substance.

16. The system of claim 15, further comprising report software associated with the central processor, the report software configured to generate reports relating to the at least one operating adjustment.

17. The system of claim 15, further comprising a client processor in communication with the central processor, wherein the client processor is configured to allow for accessing, inputting, querying, downloading, and requesting reports relating to any of the emissions information, the carbon valuation information, and the at least one operating adjustment.

18. The system of claim 15, further comprising verification software associated with the central processor, the verification software being configured to transmit verification information comprising verification of the destruction of the at least one regulated substance to any third party verifier or verification entity.

19. The system of claim 15, further comprising report software associated with the central processor, the report software being configured to generate reports relating to the emissions information, the carbon valuation information, or the at least one operating adjustment.

* * * * *